US012236737B2

(12) United States Patent
Murao

(10) Patent No.: US 12,236,737 B2
(45) Date of Patent: Feb. 25, 2025

(54) MEDIUM PROCESSING DEVICE AND CASH HANDLING DEVICE

(71) Applicant: Oki Electric Industry Co., Ltd., Tokyo (JP)

(72) Inventor: Yoshiki Murao, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 197 days.

(21) Appl. No.: 17/922,920

(22) PCT Filed: Apr. 21, 2021

(86) PCT No.: PCT/JP2021/016149
§ 371 (c)(1),
(2) Date: Nov. 2, 2022

(87) PCT Pub. No.: WO2021/246071
PCT Pub. Date: Dec. 9, 2021

(65) Prior Publication Data

US 2023/0169815 A1 Jun. 1, 2023

(30) Foreign Application Priority Data

Jun. 5, 2020 (JP) ................................. 2020-098894

(51) Int. Cl.
*G07D 11/14* (2019.01)
*G07D 11/22* (2019.01)
*G07D 11/40* (2019.01)

(52) U.S. Cl.
CPC ............. *G07D 11/14* (2019.01); *G07D 11/22* (2019.01); *G07D 11/40* (2019.01); *G07D 2211/00* (2013.01)

(58) Field of Classification Search
CPC ........ G07D 11/14; G07D 11/22; G07D 11/40; G07D 2211/00
See application file for complete search history.

(56) References Cited

U.S. PATENT DOCUMENTS 10,482,701 B2 * 11/2019 Yanagiuchi .............. B65H 9/20
11,401,122 B2 * 8/2022 Hayashi ................. G07D 11/14
2017/0294068 A1 * 10/2017 Akagi ...................... B65H 7/14

FOREIGN PATENT DOCUMENTS

JP H10-69562 A 3/1998
JP H10-222721 A 8/1998
JP H10-255104 A 9/1998
JP 2012-088998 A 5/2012

* cited by examiner

*Primary Examiner* — Howard J Sanders
(74) *Attorney, Agent, or Firm* — Rabin & Berdo, P.C.

(57) ABSTRACT

A medium processing device includes a depositing/dispensing unit that has a feeding unit into which media are fed and a shutter opening/closing the feeding unit and a foreign material storage unit that is disposed on a side opposite to the feeding unit with a gap formed in the depositing/dispensing unit interposed therebetween and stores foreign materials that have entered from the gap.

9 Claims, 18 Drawing Sheets

MEDIUM PROCESSING DEVICE AND CASH HANDLING DEVICE

TECHNICAL FIELD

The present invention relates to a medium processing device and a cash handling device and, for example, is appropriate for an application to an automatic teller machine (ATM) performing a desired transaction by allowing a user to input bills and coins.

BACKGROUND ART

Conventionally, in an automatic teller machine and the like used by a financial organization and the like, for example, a method of allowing a user to input cash such as bills, coins, and the like and allowing a user to withdraw cash in accordance with transaction details with the user is in wide use. Among such automatic teller machines, for example, there is a type in which a medium processing device performing a process relating to coins is included inside. The medium processing device, for example, includes a depositing/dispensing unit that gives/receives coins to/from a user, a separation unit that separates integrated coins one by one, a conveyance unit that conveys coins, an identifying unit (also referred to as a recognition unit) that identifies a coin type, authenticity, and the like of an input coin, a housing unit that houses coins sorted by denomination, and the like.

In such a medium processing device, an optical sensor detecting coins, foreign materials, and the like inside the depositing/dispensing unit may be disposed in the depositing/dispensing unit. In addition, in the depositing/dispensing unit, a hole portion for a sensor, which transmits light of the sensor, that is essential for the function is appropriately formed (for example, see Patent Literature 1).

CITATION LIST

Patent Literature

Patent Literature 1: JP H10-255104A

SUMMARY OF INVENTION

Technical Problem

However, there are cases in which a foreign material enters the medium processing device from the depositing/dispensing unit through a gap such as the hole portion for the sensor or the like. This may cause miscalculation or cause the drive unit to stop by applying a load thereto, and there is possibility that reliability will not be maintained.

The present invention is in consideration of the points described above and proposes a medium processing device and a cash handling device capable of maintaining reliability.

Solution to Problem

In order to solve such a problem, in a medium processing device according to the present invention, a depositing/dispensing unit that has a feeding unit into which media are fed and a shutter opening/closing the feeding unit and a foreign material storage unit that is disposed on a side opposite to the feeding unit with a gap formed in the depositing/dispensing unit interposed therebetween and stores foreign materials that have entered from the gap are disposed.

In addition, in a cash handling device according to the present invention, an operation unit that accepts a user's operation and the medium processing device described above are disposed.

According to the present invention, foreign materials that have entered a gap from a space storing media can be stored by the foreign material storage unit, and the foreign materials can be prevented from entering each part inside the medium processing device.

Advantageous Effects of Invention

According to the present invention, a medium processing device and a cash handling device capable of maintaining reliability can be realized.

DESCRIPTION OF EMBODIMENTS

Hereinafter, embodiments for performing the invention (hereinafter referred to as embodiments) will be described with reference to the drawings.

1. Configuration of Automatic Teller Machine

Figure 1:
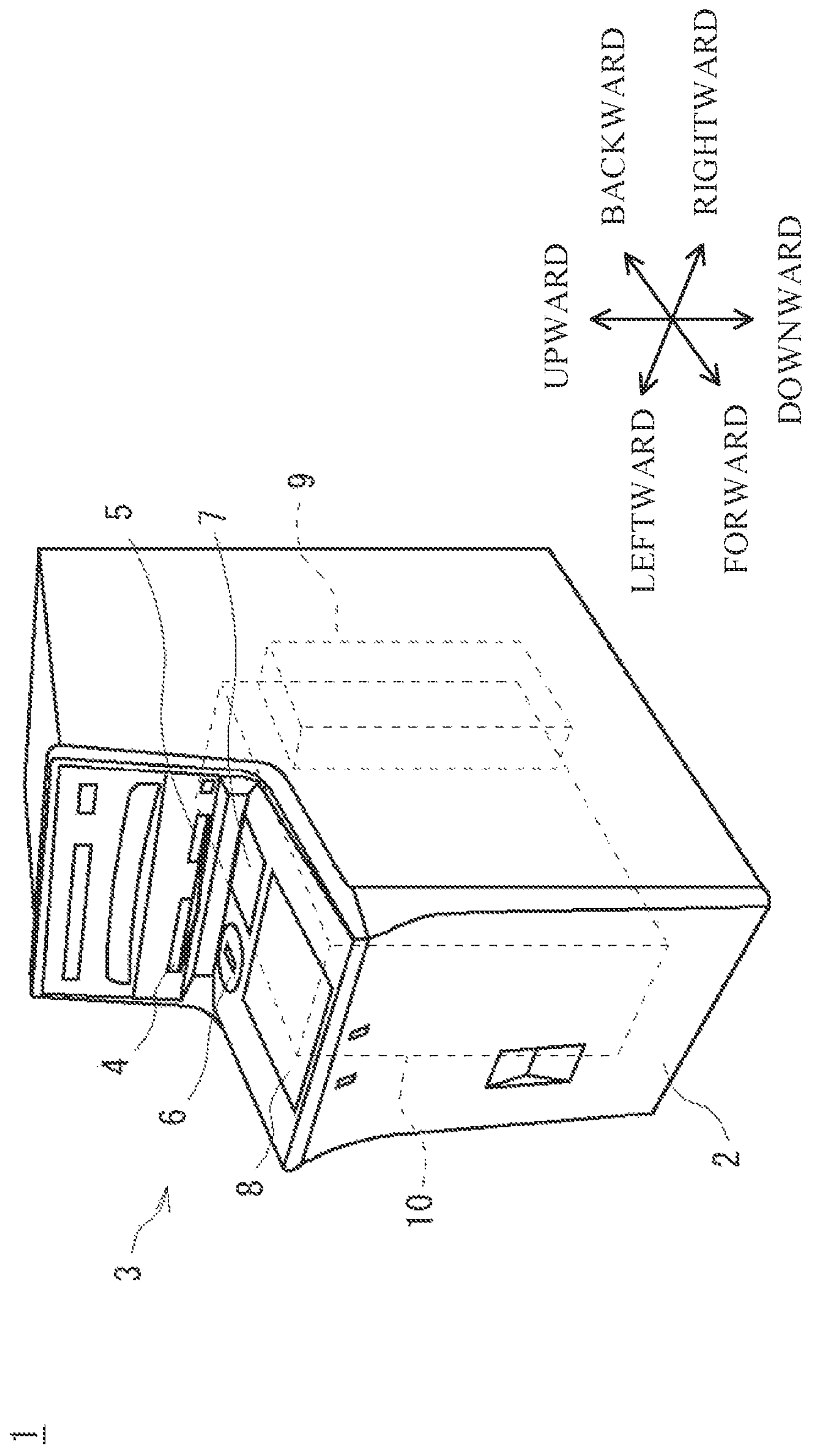
FIG. 1 is a perspective view illustrating a configuration of an automatic teller machine.

As shown from the exterior illustrated in FIG. 1, an automatic teller machine 1 is a cash handling device mainly composed of a box-shaped casing 2 and, for example, is installed in a financial organization, any one of various commercial facilities, or the like and performs transactions relating to cash with a user (in other words, a customer of a financial organization or a commercial facility, or the like) such as a depositing process and a dispensing process.

In the casing 2, a reception unit 3 is disposed at a place at which input of a bill, an operation using a touch panel, and the like can be easily performed in a state in which a user faces the front of the casing 2. In the reception unit 3, a bankbook entrance/exit port 4, a card entrance/exit port 5, a coin depositing/dispensing port 6, a bill depositing/dispensing port 7, an operation display unit 8, and the like are disposed, and the reception unit 3 directly exchanges, for example, cash, a card, or the like with a user and receives a notification of information about a transaction and an operation instruction.

The bankbook entrance/exit port 4 is a part into which a bankbook is inserted and that discharged from the bankbook. On an inner side of the bankbook entrance/exit port 4, a bankbook processing unit (not illustrated) that reads magnetic information from a magnetic recording part disposed on a back cover or the like of a bankbook and records details of a transaction in the bankbook is disposed. The card entrance/exit port 5 is a part into or from which various cards such as a cash card and the like are inserted or discharged. On an inner side of the card entrance/exit port 5, a card processing unit (not illustrated) that reads an account number and the like, which are magnetically recorded on various cards, is disposed.

The coin depositing/dispensing port 6 is a part into which coins deposited by a user are inserted and to which coins dispensed to a user are discharged. The bill depositing/dispensing port 7 is a part into which bills deposited by a user are put and from which bills dispensed to a user are discharged. Each of the coin depositing/dispensing port 6 and the bill depositing/dispensing port 7 is opened or closed by driving a shutter. The operation display unit 8 is a touch panel serving as an operation unit in which a liquid crystal display panel displaying an operation screen, transaction details, and the like at the time of a transaction and a touch sensor detecting a user's input operation are integrated.

Hereinafter, a side of the automatic teller machine 1 that is faced by a user will be referred to as the front, and a side opposite thereto will be referred to as the rear, the left and right sides as seen by a user facing the front will be respectively referred to as the left and right sides, and an upper side and a lower side are further defined in description.

Inside the casing 2, a main control unit 9 that performs overall control of the automatic teller machine 1, a coin processing device 10 that performs various processes relating to coins that are transaction targets, a bill processing device (not illustrated) that performs various processes relating to bills, and the like are disposed. The main control unit 9 is mainly composed of a central processing unit (CPU) that is not illustrated and reads a predetermined program from a read only memory (ROM), a flash memory, or the like that are not illustrated and executes the predetermined program, thereby performing various processes such as a depositing process, a dispensing process, and the like. In addition, the main control unit 9 has inside it a storage unit that is formed from a random access memory (RAM), a hard disk drive, a flash memory, and the like and stores various kinds of information in this storage unit.

The coin processing device 10 is formed in a shape similar to a rectangular parallelepiped as a whole and is attached to the casing 2 through a slide rail that is not illustrated in the drawing. In addition, on a front face side or a rear face side of the casing 2, a door (not illustrated) that can be opened or closed is disposed. For this reason, in a case in which a maintenance operation or the like is performed, the automatic teller machine 1, after opening a door disposed on the front face side or the rear face side of the casing 2, causes the coin processing device 10 to slide to the front or the rear, thereby causing the coin processing device 10 to be positioned outside the casing 2 or to be housed inside the casing 2.

2. Configuration of Coin Processing Device

Figure 2:
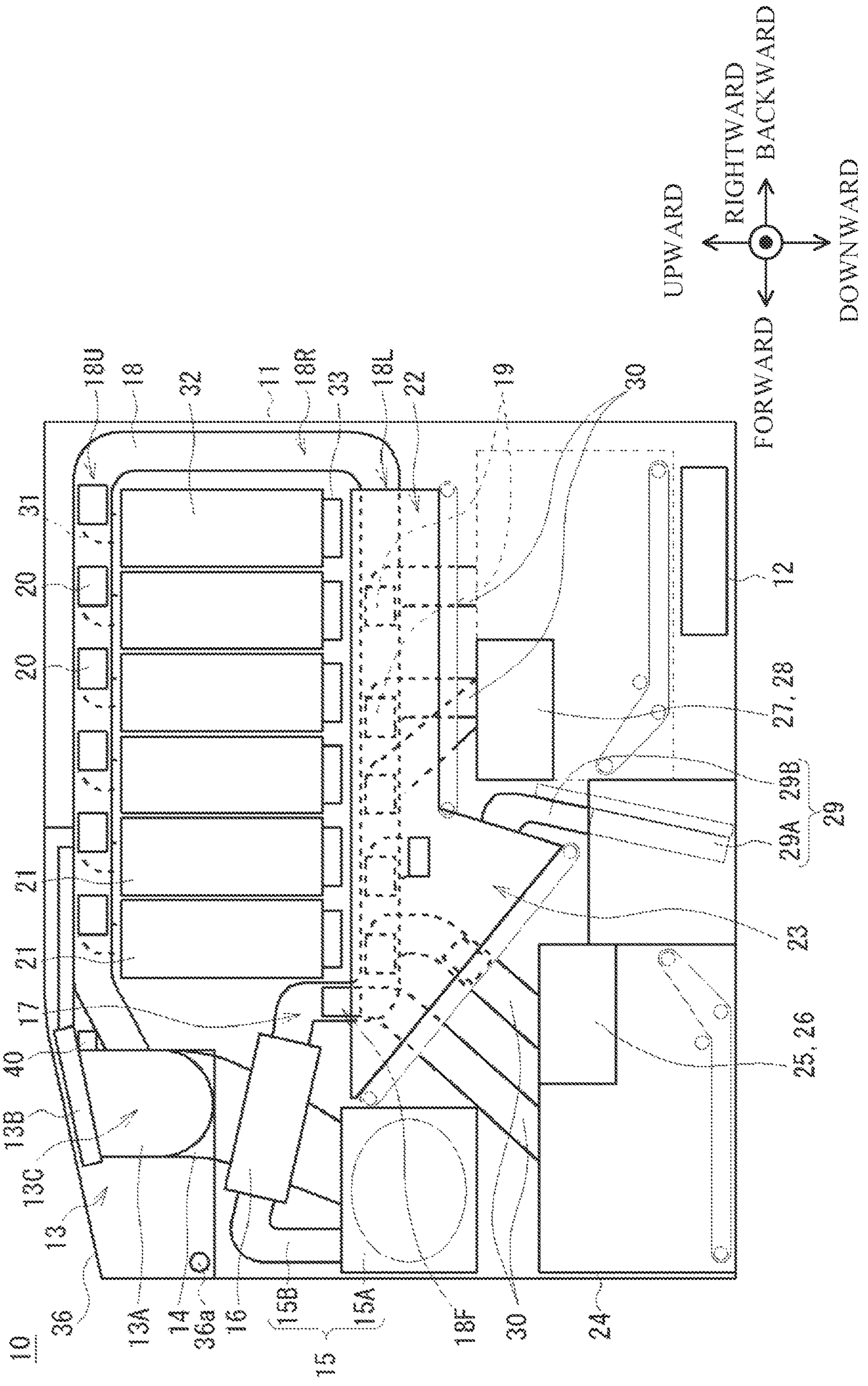
FIG. 2 is a right-side view illustrating a configuration of a coin processing device in a customer service unit closed state and a container closed state.

As shown in a schematic right-side view illustrated in FIG. 2, in the coin processing device 10, a plurality of parts performing various processes relating to coins are built inside the coin processing device casing 11. These coins, for example, are formed of a material of a non-magnetic body having sufficient strength such as an alloy of copper and nickel, aluminum, or the like and are formed in thin plate shapes. In the coin processing device 10, a plurality of types of coins having different diameters and different thicknesses are assumed to be handled.

Inside the coin processing device casing 11, a depositing/dispensing unit 13, a chute unit 14, an upper separation unit 15, a recognition and conveyance unit 16, a delivery unit 17, a pin belt conveyance unit 18, 6 stacker units 21, a dispensing conveyance unit 22, and a temporary storage unit 23 are disposed relatively upward or near the center. In addition, inside the coin processing device casing 11, a coin control unit 12, a supplementary recovery storage 24, a first supplementary rejection storage 25, a second supplementary rejection storage 26, a rejection storage 27, a lost acquisition storage 28, and a lower separation unit 29 are disposed on a relatively lower side.

Similar to the main control unit 9, the coin control unit 12 is mainly composed of a CPU that is not illustrated and reads a predetermined program from a ROM, a flash memory, or the like that is not illustrated and executes the predetermined program, thereby performing various processes such as a depositing process, a dispensing process, and the like to perform overall control of the coin processing device 10. In addition, the coin control unit 12 has inside of it a storage unit formed from a RAM, a flash memory, and the like and causes this storage unit to store various kinds of information.

By taking/giving coins from/to a user, the depositing/dispensing unit 13 allows the user to deposit the coins or allows the user to withdraw the coins. The depositing/dispensing unit 13 has a container 13A that has an opening portion on an upper side and houses coins, a shutter 13B that opens or closes the opening portion, a sensor (not illustrated) that detects presence/absence of coins inside the container 13A, and the like.

Figure 3:
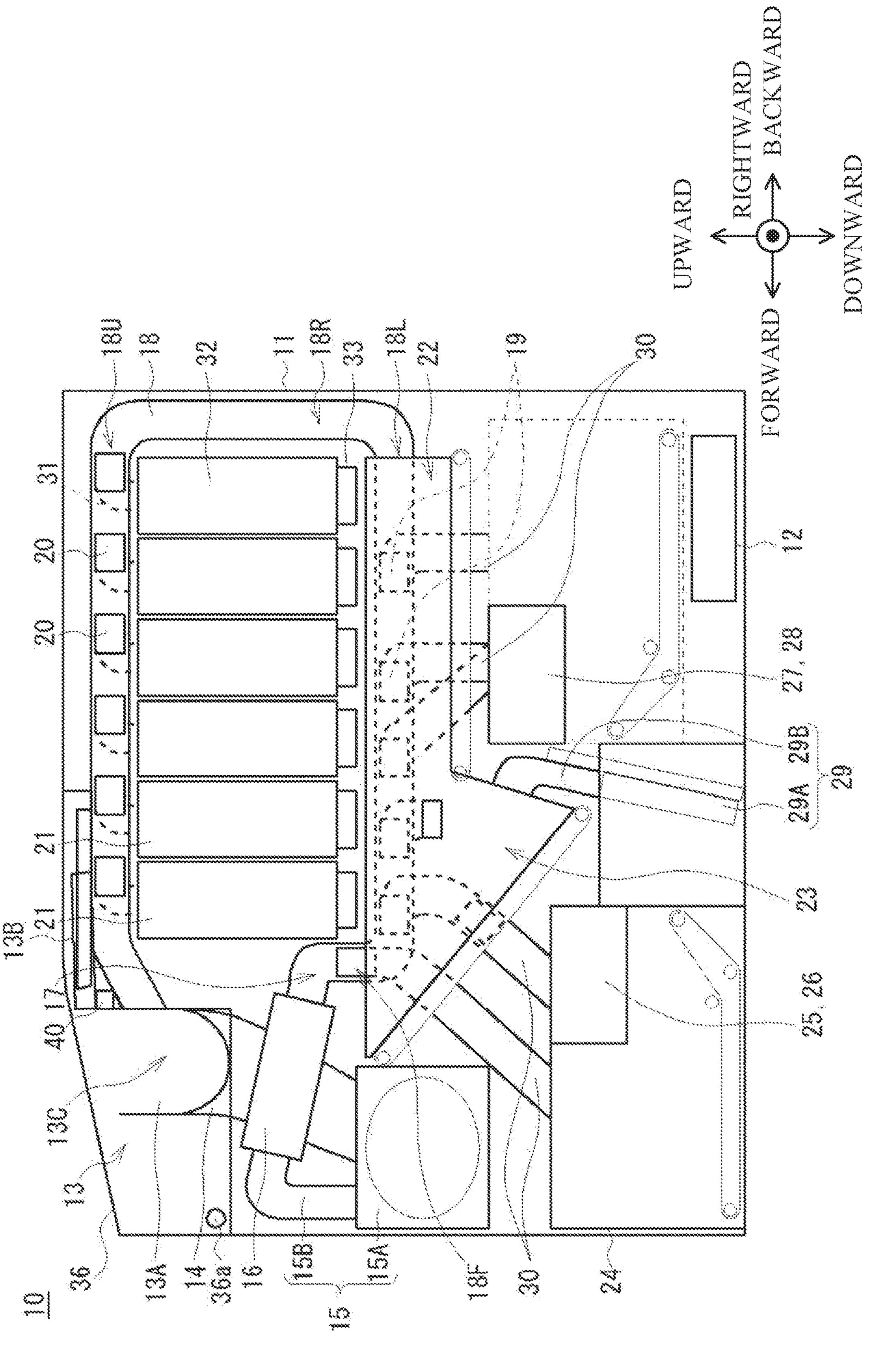
FIG. 3 is a right-side view illustrating a configuration of a coin processing device in a customer service unit closed state and a container open state.

When coins are put into the container 13A by a user in a state in which the shutter 13B is slidably moved to a rear side to open as illustrated in FIG. 3, the depositing/dispensing unit 13 moves the shutter 13B to a front side to be closed as illustrated in FIG. 2, delivers the coins from the inside of the container 13A to the chute unit 14 to fall inside the chute unit 14 and causes the coins to reach the inside of the upper separation unit 15. In addition, when coins are conveyed from the pin belt conveyance unit 18 to be described below in a state in which the shutter 13B is closed, the depositing/dispensing unit 13 houses the coins inside the container 13A and thereafter opens the shutter 13B to allow a user to receive the coins.

The upper separation unit 15 is composed of an integration separation part 15A that is a part occupying a relatively large volume on a lower side and a separation conveyance part 15B that is formed to protrude from the integration separation part 15A to the upper side. This upper separation unit 15 integrates coins in the integration separation part 15A, separates these coins one by one, conveys the coins upward by the separation conveyance part 15B, further conveys the coins along the conveyance path backward, and delivers the coins to the recognition and conveyance unit 16.

The recognition and conveyance unit 16 is positioned on the right side of the chute unit 14, images a coin while conveying it, and determines whether or not the coin can be handled on the basis of a denomination, authenticity, a degree of damage, or the like of the coin based on an acquired image signal. In addition, the recognition and conveyance unit 16 notifies of an acquired determination result to the coin control unit 12 as a result of recognition of the coin and delivers the coin to the delivery unit 17. The delivery unit 17 delivers the coin received from the recognition and conveyance unit 16 to the pin belt conveyance unit 18.

The pin belt conveyance unit 18 surrounds a front-side lower part, a lower side, a rear side, and an upper side of the stacker units 21 respectively with a front-pin belt conveyance unit 18F, a lower-pin belt conveyance unit 18L, a rear-pin belt conveyance unit 18R, and an upper-pin belt conveyance unit 18U, thereby forming a conveyance path that is a path along which coins are conveyed. The pin belt conveyance unit 18 is composed of a conveyance guide that is brought into contact with a surface of a coin and guides the coin to advance along a conveyance path and a pin belt that travels along the entire conveyance path. In this pin belt, a pin that is brought into contact with a tail side of a coin and is used for pressing the coin in a conveyance direction is disposed. By causing the pin belt to travel, the pin belt conveyance unit 18 conveys a coin received from the delivery unit 17 along the conveyance path and discharges the coin to the inside of the container 13A of the depositing/dispensing unit 13.

In addition, in the pin belt conveyance unit 18, branching parts 19 that cause the conveyance path of coins to branch are disposed at a plurality of places disposed in a front-side lower part and on a lower side of the stacker units 21. On the left side of each branching part 19, a guide part 30 that guides coins is disposed.

Each branching part 19 has a guide plate that can rotate, an actuator, and the like (none thereof is illustrated) and, by rotating the guide plate on the basis of control of the coin control unit 12, switching between advancing coins along the pin belt conveyance unit 18 and branching coins to each guide part 30 is performed. Each guide part 30 causes a coin to advance to the supplementary recovery storage 24, the first supplementary rejection storage 25 or the second supplementary rejection storage 26, the temporary storage unit 23, the rejection storage 27, the lost acquisition storage 28, and the like.

Furthermore, in the pin belt conveyance unit 18, stacker branching parts 20 are disposed at 6 places above the 6 stacker units 21. On the left side of each stacker branching part 20, a guide part 31 that guides coins to the stacker unit 21 is disposed.

Each stacker branching part 20 is configured similar to each branching part 19, and, by rotating the guide plate on the basis of control of the coin control unit 12, switching between causing coins to advance along the pin belt conveyance unit 18 and causing coins to branch to each stacker unit 21 is performed.

Each stacker unit 21 has a guide part 31 that is associated with a coin of a predetermined type and is disposed on an upper side, an integration part 32 that integrates coins to be piled with overlapping each other in a vertical direction on a lower side of the guide part 31, and a feed-out part 33 that feeds out coins from a lower side of the integration part 32. When coins conveyed by the pin belt conveyance unit 18 are received from the stacker branching part 20, this stacker unit 21 guides the coins to the integration part 32 to be integrated using the guide part 31. In addition, the stacker unit 21 feeds out coins integrated in the integration part 32 one by one using the feed-out part 33 on the basis of control of the coin control unit 12 and causes the coins to fall into the dispensing conveyance unit 22 or the temporary storage unit 23 disposed on the lower side.

The dispensing conveyance unit 22 is positioned on the right side of the pin belt conveyance unit 18, in other words, on a front side of a sheet face of FIG. 2, is configured as a hollow rectangular parallelepiped of which an upper side and a front side are open and forms a space in which coins can be housed inside. In addition, the dispensing conveyance unit 22 has a belt conveyance mechanism formed from a belt, a pulley, and the like built therein on the bottom and places or integrates coins fed out from the stacker unit 21 on the belt. By causing an upper part of the belt to travel to the front side in a state in which coins are placed or integrated on the belt, this dispensing conveyance unit 22 causes the coins to fall into the temporary storage unit 23 disposed on the front side.

The temporary storage unit 23 is configured such that the bottom is forwardly inclined upward, and left and right side plates are formed in a triangle shape, has a space housing coin formed inside thereof, and has a belt conveyance mechanism built on the bottom therein. For this reason, the temporary storage unit 23 places or integrates coins fed out from the stacker unit 21 and coins conveyed from the dispensing conveyance unit 22 on a belt disposed in the internal space. In addition, by causing an upper part of the belt to travel to be forwardly inclined upward in a state in which coins are placed or integrated on the belt, the temporary storage unit 23 feeds out the coins to the upper separation unit 15 disposed on the front side and causes the coins to fall into the inside thereof.

The supplementary recovery storage 24 has an integration part that integrates coins inside thereof, a conveyance mechanism that conveys coins integrated in the integration part, and the like. This supplementary recovery storage 24 integrates coins guided by the guide part 30, feeds out the coins integrated inside to the front side, and delivers the coins to the lower separation unit 29. Each of the first supplementary rejection storage 25 and the second supplementary rejection storage 26 has a space in which coins are integrated inside and integrates coins guided by the guide part 30. Each of the rejection storage 27 and the lost acquisition storage 28 has a space in which coins are integrated inside thereof and integrates coins guided by the guide part 30.

The lower separation unit 29 is disposed at a position adjacent to a rear side of the supplementary recovery storage 24. Although this lower separation unit 29 has a configuration similar to the upper separation unit 15, an installation direction with respect to the coin processing device casing 11 is different from that of the upper separation unit 15. This lower separation unit 29 is composed of an integration separation part 29A and a separation conveyance part 29B that respectively correspond to the integration separation part 15A and the separation conveyance part 15B. The lower separation unit 29 receives coins from the supplementary recovery storage 24 and integrates the coins inside thereof, separates the integrated coins one by one and conveys the coins to the upper side one by one, and discharges the coins to the inside of the temporary storage unit 23.

3. Conveyance of Coins in Various Processes

Next, conveyance, integration, and the like of coins in various processes accompanying conveyance of coins in the coin processing device 10, that is, a depositing process, a dispensing process, and the like will be described. Here, each process performed in the coin processing device 10 in a case in which a depositing transaction and a dispensing transaction are performed between the automatic teller machine 1 and a user will be described.

In a case in which a depositing transaction is performed between the automatic teller machine 1 (FIG. 1) and a user, the coin processing device 10 counts the number of coins while recognizing types and the like of the coins input by the user using a depositing and counting process of a previous stage and conveys the coins to appropriate housing places and houses the coins therein using a depositing and housing process of a later stage that follows this. More specifically, when a user is allowed to input coins to the depositing/dispensing unit 13 in the depositing and counting process of the previous stage, the coin processing device 10 houses the coins in the temporary storage unit 23 sequentially through the chute unit 14, the upper separation unit 15, the recognition conveyance unit 16, the delivery unit 17, and the pin belt conveyance unit 18.

At this time, the coin processing device 10 totals input amounts on the basis of results of recognition of coins using the recognition conveyance unit 16, displays the total on the operation display unit 8 (FIG. 1), and allows a user to select to continue or stop the depositing transaction. The coin processing device 10 performs the depositing and housing process of the later stage in a case in which continuation is selected by the user, stops the depositing transaction in a case in which stop is selected, and, similar to the case of a dispensing process to be described below, conveys and returns the coins to the depositing/dispensing unit 13.

In the depositing and housing process of the later stage, the coin processing device 10 conveys coins to the stacker unit 21 to be integrated therein from the temporary storage unit 23 sequentially through the upper separation unit 15, the recognition conveyance unit 16, the delivery unit 17, the pin belt conveyance unit 18, and the stacker branching parts 20. At this time, the coin processing device 10 conveys the coin to the stacker unit 21 according to the type of the coin on the basis of results of recognition of coins using the recognition conveyance unit 16.

In a case in which a dispensing transaction with a user is performed in the automatic teller machine 1 (FIG. 1), the coin processing device 10 conveys coins corresponding to an amount of money instructed by the user to the depositing/dispensing unit 13 and dispenses the coins by using the dispensing process. More specifically, when an indication for starting a dispensing transaction or an operation input of an amount of money to be dispensed is received from a user through the operation display unit 8 (FIG. 1), the coin processing device 10 starts a dispensing process and causes each stacker unit 21 to dispense coins of types and the number corresponding to the amount of money to be dispensed and integrates the coins inside the temporary storage unit 23 through the dispensing conveyance unit 22. Subsequently, the coin processing device 10 conveys coins to be housed in the depositing/dispensing unit 13 sequentially through the temporary storage unit 23, the upper separation unit 15, the recognition conveyance unit 16, the delivery unit 17, and the pin belt conveyance unit 18 and allows a user to receive the coins.

In addition, the coin processing device 10 is configured to perform a supplementing process of supplementing coins from the supplementary recovery storage 24 to the stacker units 21, a recovering process of recovering coins from the stacker units 21 to the supplementary recovery storage 24, and the like in addition to the depositing process and the dispensing process.

4. Configuration of Depositing/Dispensing Unit

4-1. Configuration of Container

Figure 6:
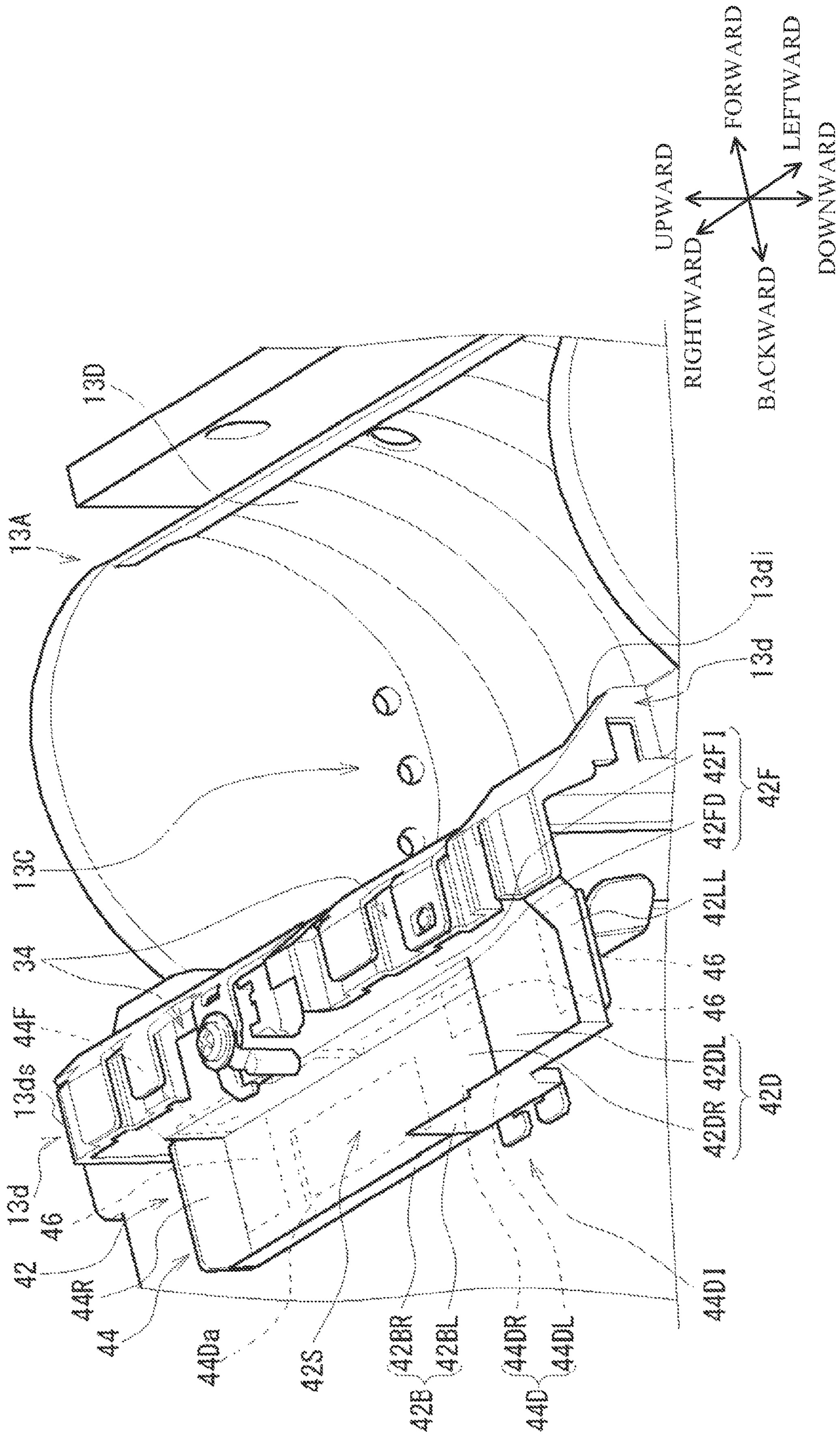
FIG. 6 is a perspective view illustrating a configuration (1) of a container and a foreign material storage unit.

As illustrated in FIG. 6, the container 13A has left and right side plates of which are in an appropriate circular shape, and a coin integration space 13C of a columnar shape that extends in a horizontal direction and integrates coins is formed. In addition, in the container 13A, a coin integration plate 13D of which a horizontal section has a shape of letter "U" faces a front side, a lower side, and a rear side of the coin integration space 13C and integrates coins on an upper side of the coin integration plate 13D.

As illustrated in FIGS. 6, 7, 8, 9, 10, 11, and 13A to 13C, near an upper end of a rear-side plate 13*d* that is a part of the depositing/dispensing unit 13, which is positioned on the rear side of the coin integration plate 13D, an inclination part 13*di* of which an upper side is inclined backward with respect to the vertical direction is disposed.

In addition, in the rear-side plate 13*d*, a shutter opposing part 13*ds* that is bent from the upper end of the inclination part 13*di* to be in a horizontal direction and extends to the rear side is disposed. In the shutter opposing part 13*ds*, at a place facing a shutter protrusion part 13Bp (to be described below) of the shutter 13B, a shutter opposing part groove 34 is engraved in a forward/backward direction from a front end to a rear end with a predetermined gap formed in a leftward/rightward direction. In accordance with this, the shutter 13B and the shutter opposing part 13*ds* are engaged with each other in a non-contacting state in accordance with the shutter protrusion part 13Bp entering into the shutter opposing part groove 34, and a so-called nesting structure is formed in a widthwise direction (the leftward/rightward direction). A gap between the shutter 13B and the shutter opposing part 13*ds* is formed to be narrower than a minimal coin that is a coin of which a size is the smallest among coins handled in the automatic teller machine 1. In accordance with this, the shutter 13B moves in a forward/backward direction without being into contact with the shutter opposing part 13*ds*, and penetration of a coin into between the shutter 13B and the shutter opposing part 13*ds* is prevented.

Figure 11:
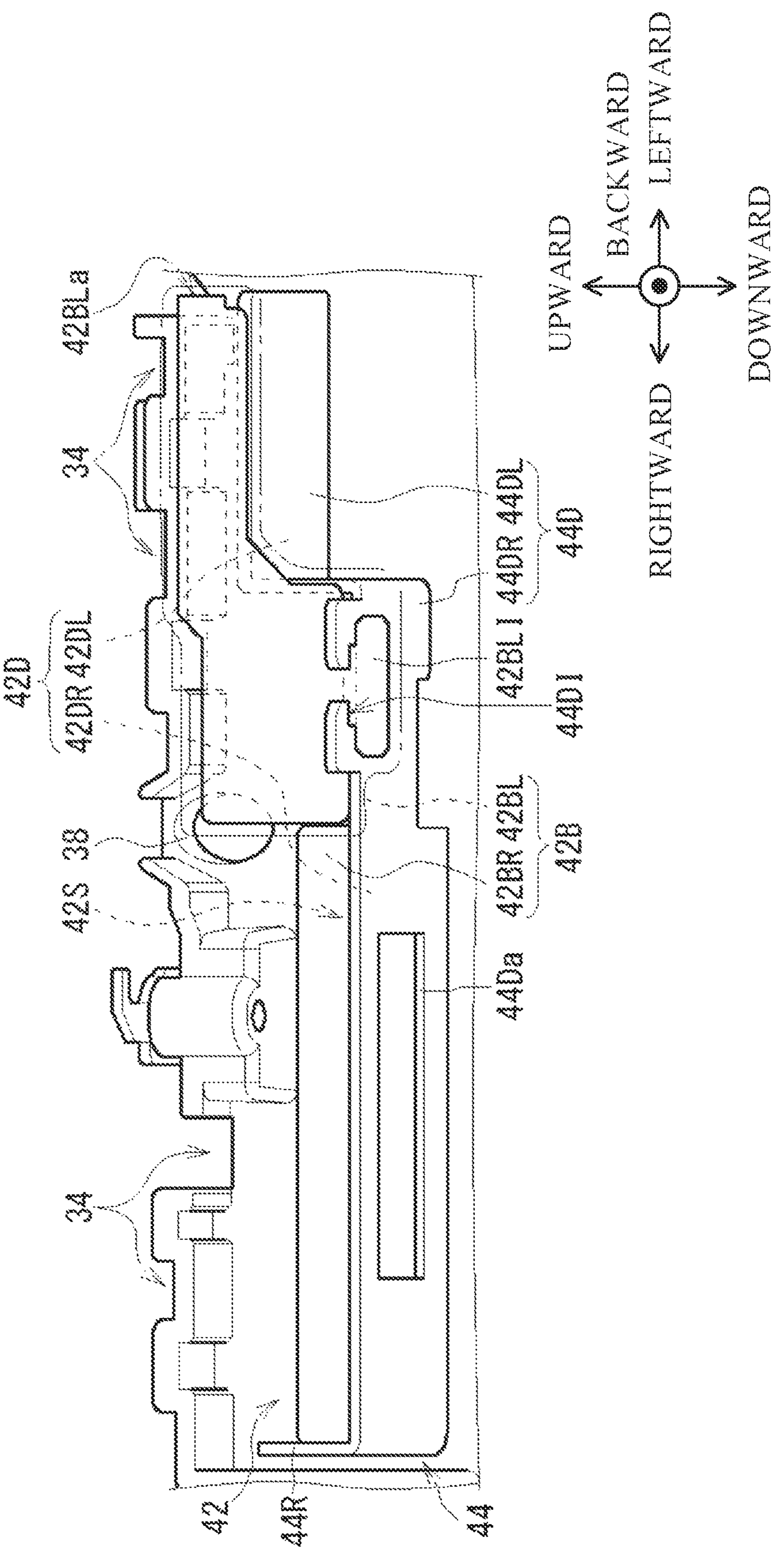
FIG. 11 is a perspective view illustrating a configuration (5) of a container and a foreign material storage unit.
Figure 12:
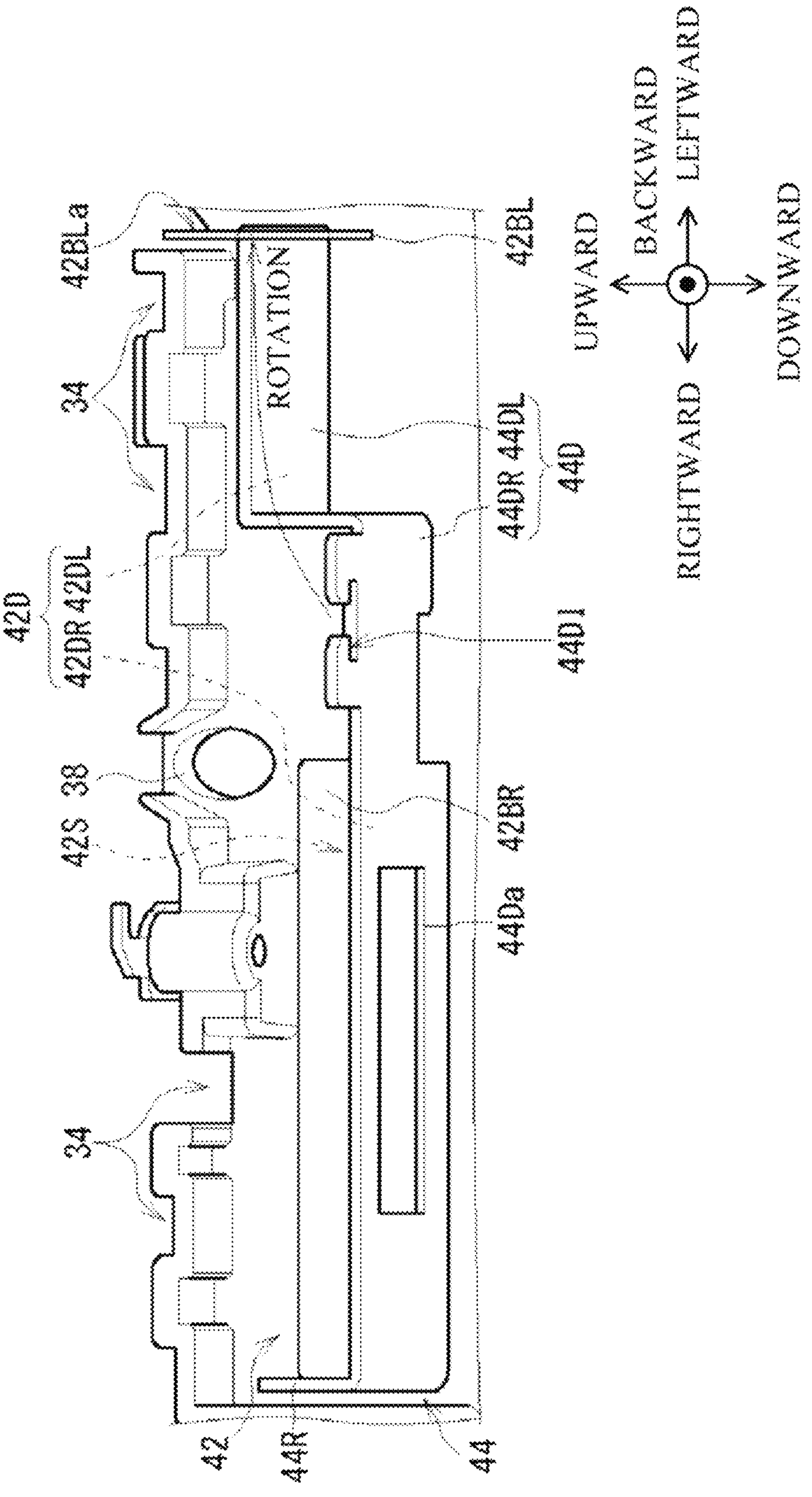
FIG. 12 is a perspective view illustrating a configuration of a container and a foreign material storage unit in a storage unit open state.

Furthermore, in the depositing/dispensing unit 13, a hand detecting sensor of an optical type (not illustrated) that detects whether a user's hand is inserted into the container 13A is disposed. For this reason, as illustrated in FIGS. 7, 8, and 11, in the inclination part 13*di* of the container 13A, a sensor hole portion 38 for transmitting light of the hand detecting sensor from a rear side of the inclination part 13*di* to a front side that is the coin integration space 13C side is formed.

Figure 5A:
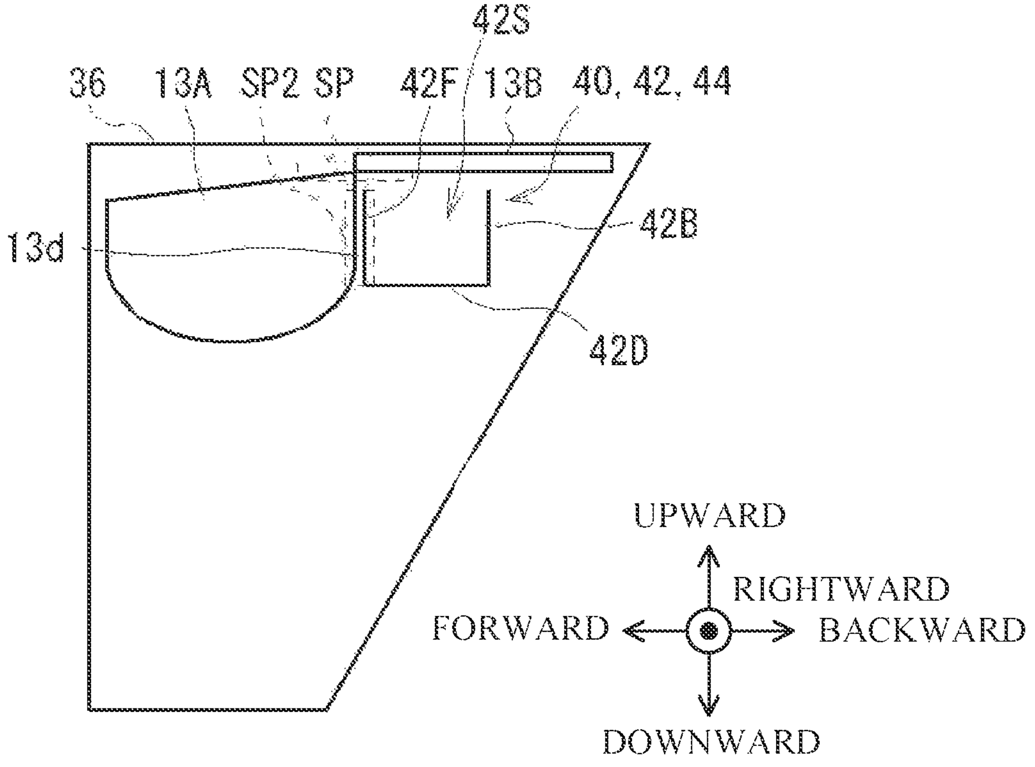
FIG. 5A is a right-side view illustrating a view in which the customer service unit rotates and is in a customer service unit closed state.
Figure 5B:
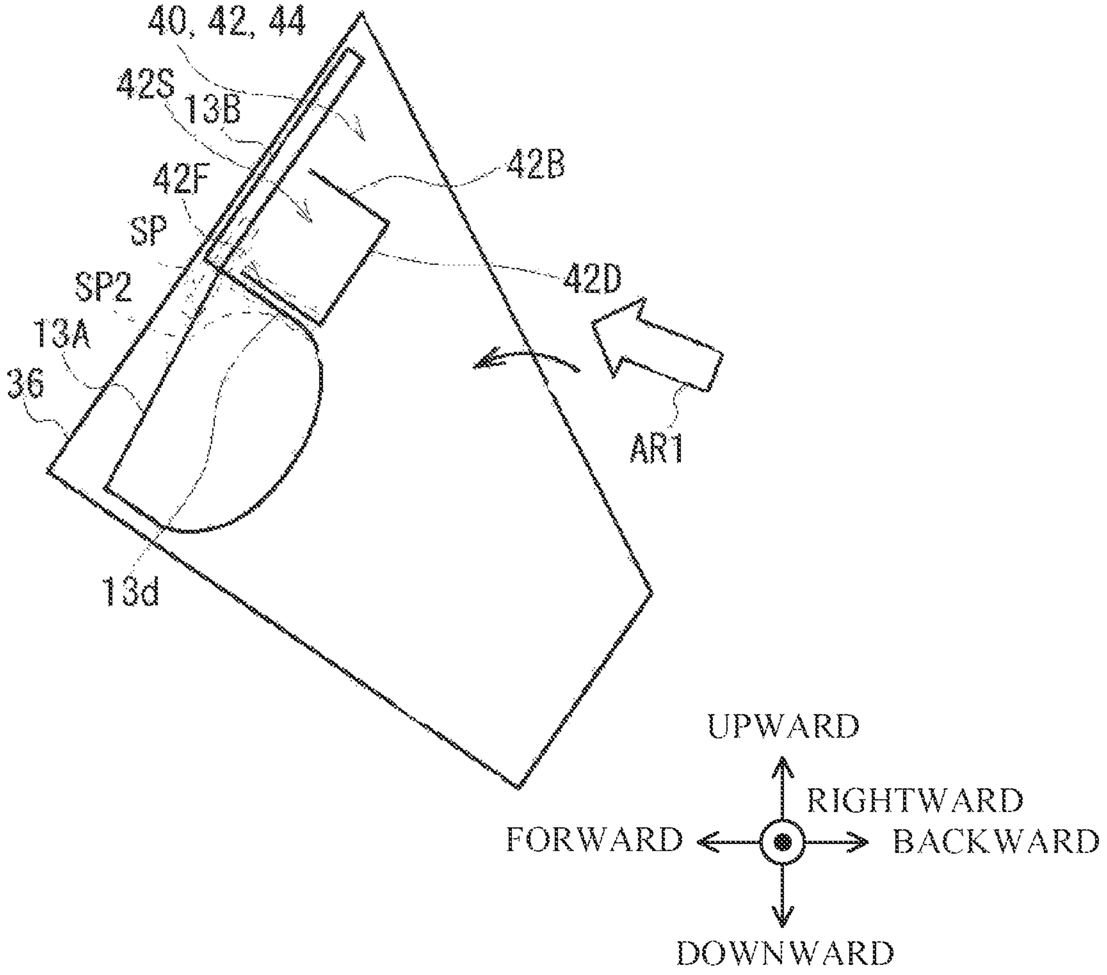
FIG. 5B is a right-side view illustrating a view in which the customer service unit rotates and is in a customer service unit closed state.

In addition, as illustrated in FIGS. 5A and 5B, between the rear-side plate 13*d* of the container 13A and a storage unit front-side plate 42F (to be described below) of a storage unit 42, a storage unit container gap SP2 that is a gap between the container 13A and the storage unit 42 is formed. Hereinafter, a shutter housing part gap SP and the sensor hole portion 38 will be collectively referred to also as a housing part inside/outside communication space 48 as a gap that is a space communicating the inside and the outside of a foreign material storage space 42S. In FIGS. 5A, 5B, 14A, and 14B, a foreign material storage unit 40 is emphasized and illustrated to be large.

4-2. Configuration of Shutter

Figure 7:
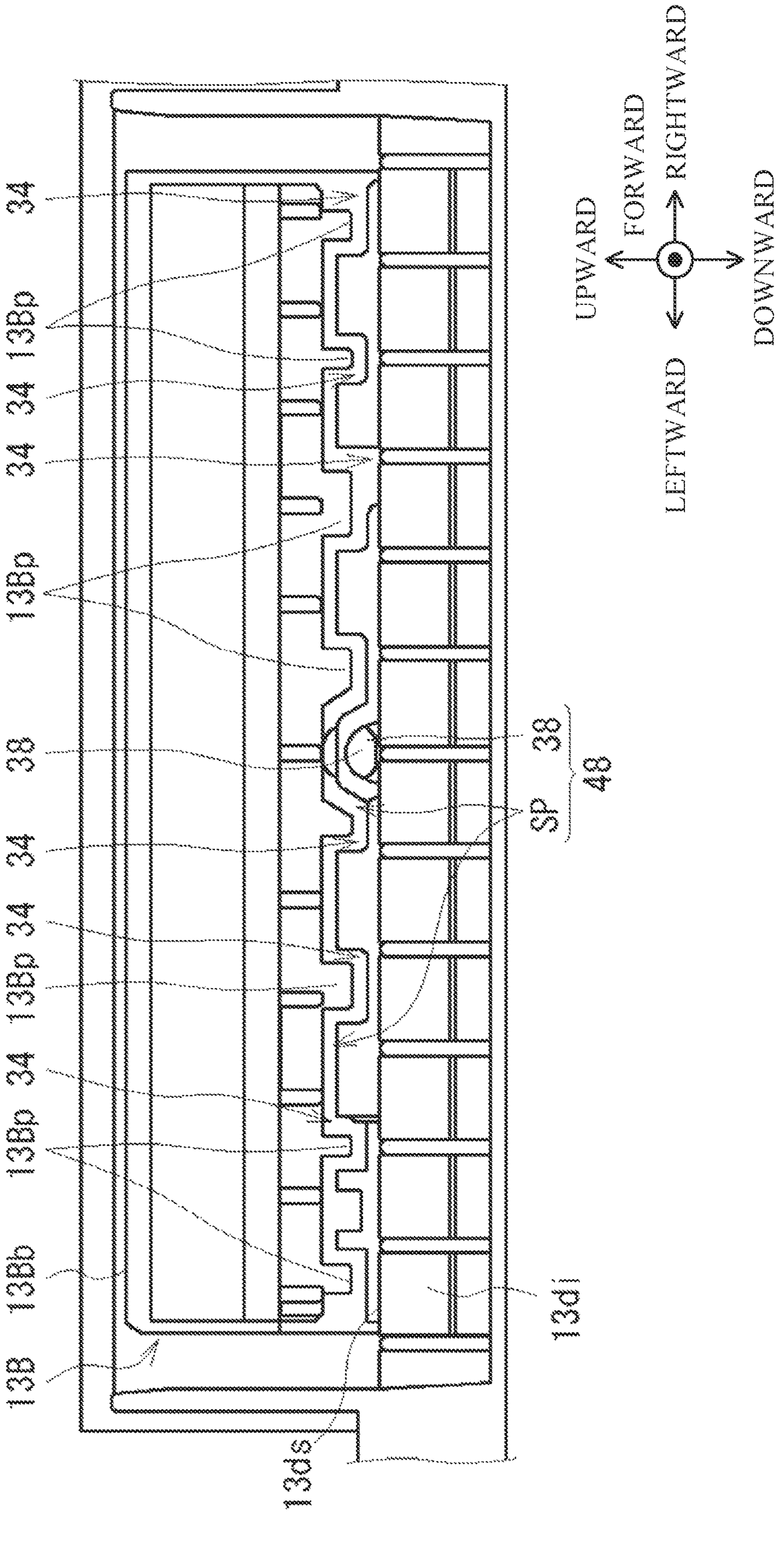
FIG. 7 is a front view illustrating a configuration of a container and a shutter.
Figure 8:
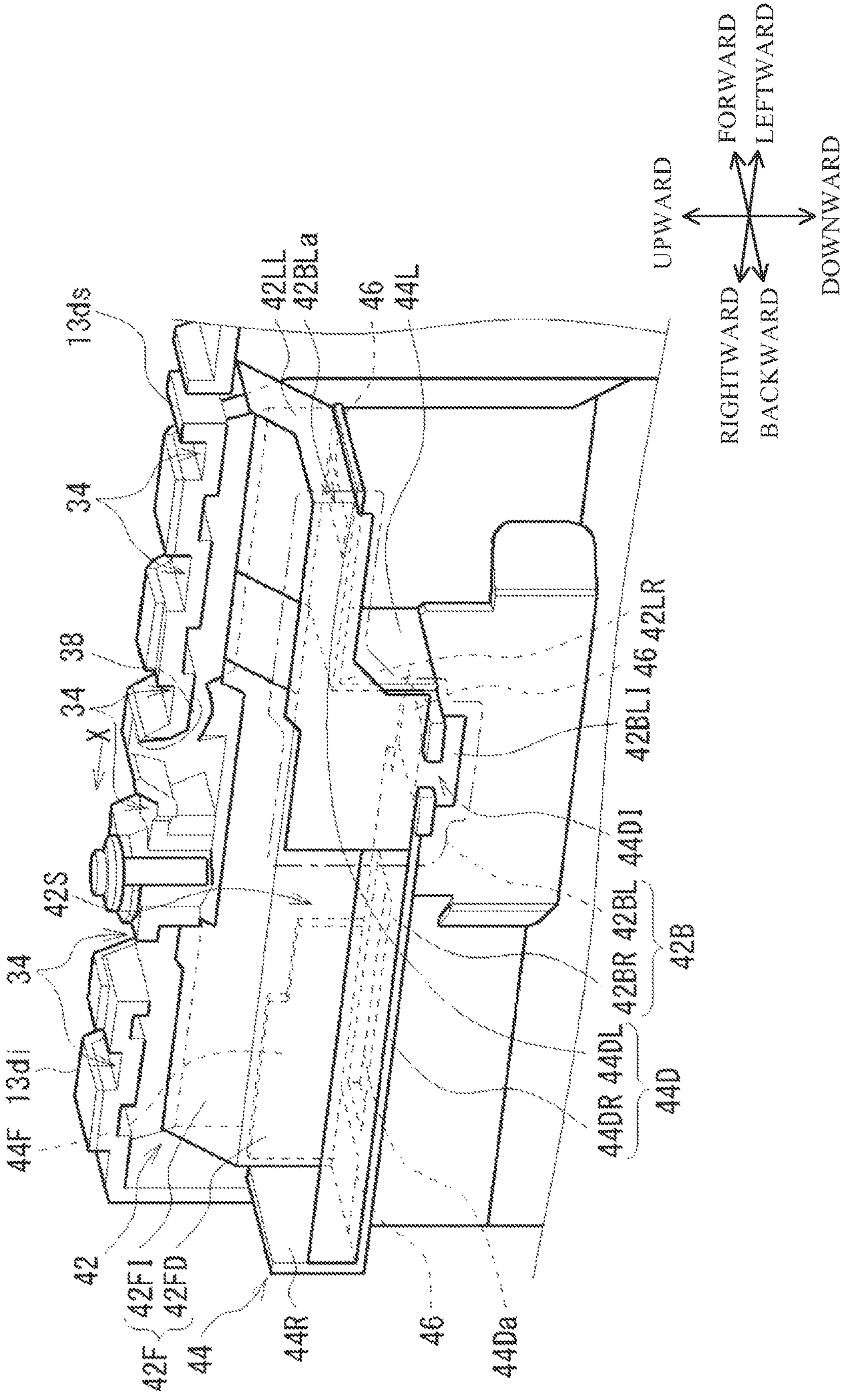
FIG. 8 is a perspective view illustrating a configuration (2) of a container and a foreign material storage unit.
Figure 9:
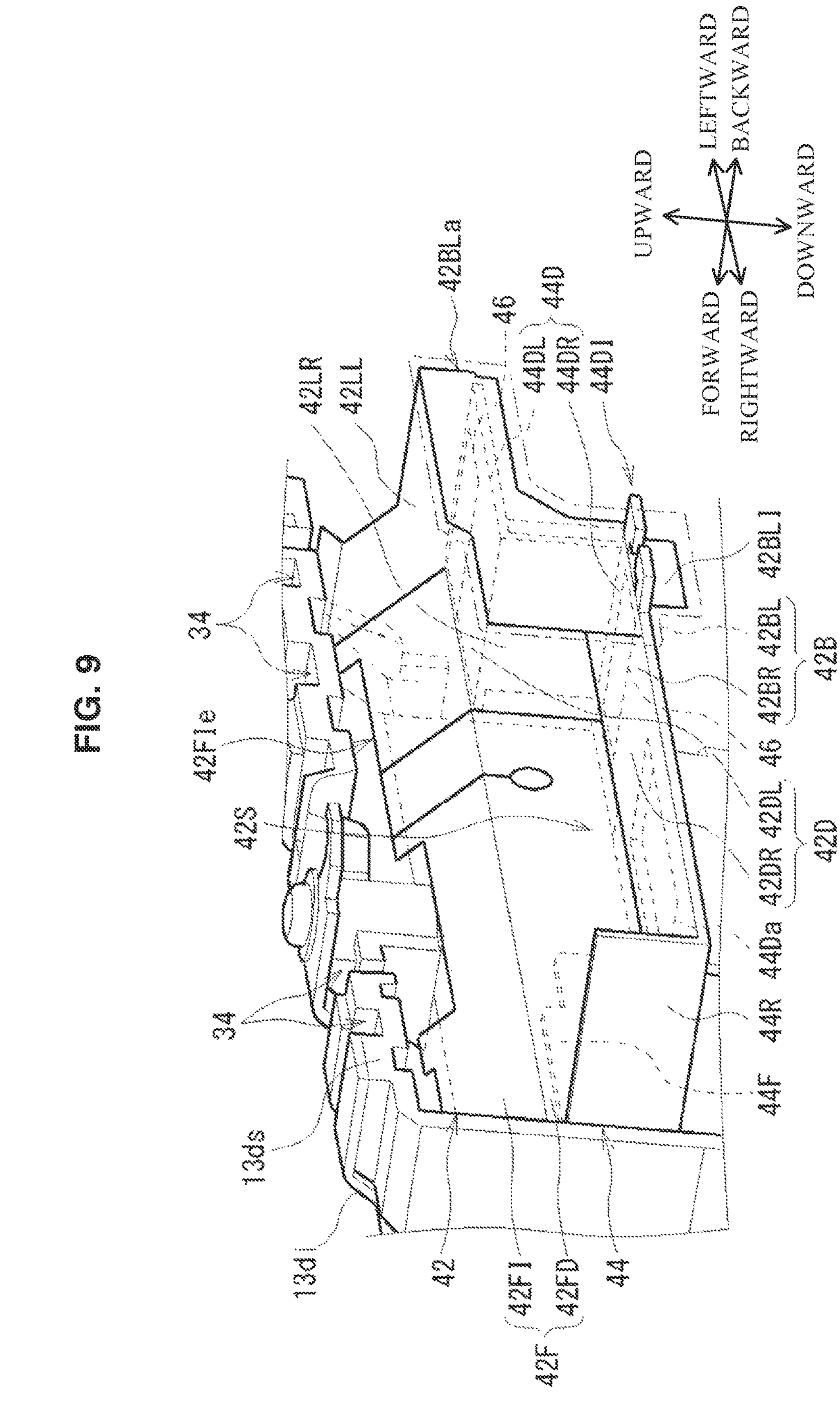
FIG. 9 is a perspective view illustrating a configuration (3) of a container and a foreign material storage unit.
Figure 10:
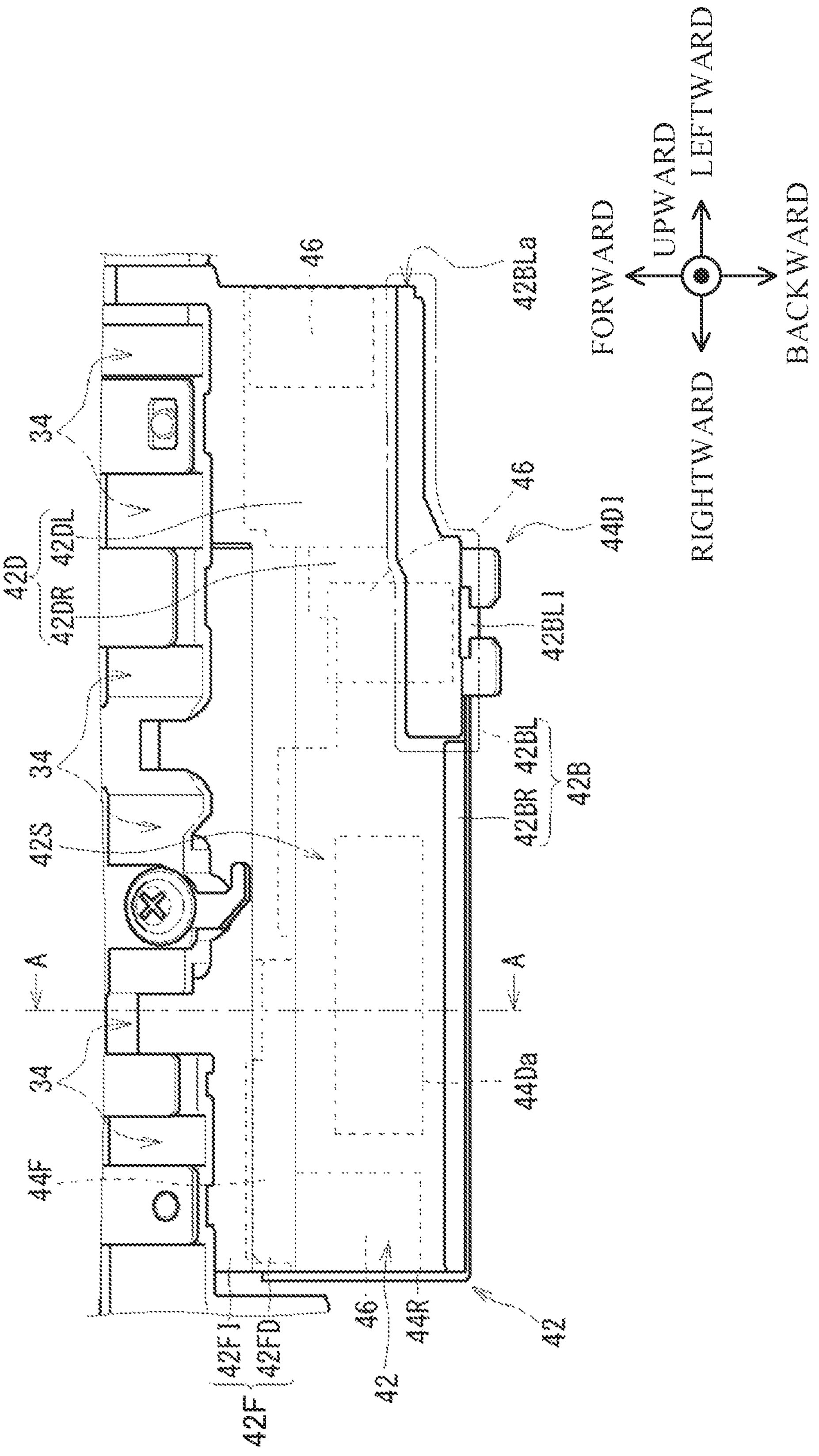
FIG. 10 is a perspective view illustrating a configuration (4) of a container and a foreign material storage unit.

As illustrated in FIG. 7, in the shutter 13B, a shutter protrusion part 13Bp is disposed to protrude in a lower direction toward the shutter opposing part 13*ds* of the rear-side plate 13*d* in the container 13A from a front end to a rear end in a forward/backward direction with a predetermined gap formed in the leftward/rightward direction in a lower face of a shutter plate shaped part 13Bb having a flat plate shape growing in forward, backward, leftward, and rightward directions.

In this way, the shutter 13B and the shutter opposing part 13*ds* of the container 13A are engaged with each other in a non-contacting state while forming a nesting structure. For this reason, between the shutter 13B and the shutter opposing part 13*ds*, the shutter housing part gap SP that is a slight space in the forward/backward direction and is an essential functional gap for allowing the shutter 13B to move without being in contact with the container 13A is formed. This shutter housing part gap SP is formed to be narrower than the minimal coin. However, when a foreign material FS such as a clip, a pin, a rubber band, a piece of paper, a waste thread, a tape, an adhesive, or the like is put into the container 13A together with regular coins, there is a possibility that the foreign material FS passes through the shutter housing part gap SP from the coin integration space 13C side (the front side) and moves to a rear side from the rear end of the shutter opposing part 13*ds*.

In addition, there is a possibility that a foreign material FS moves up to a rear side of the rear-side plate 13*d* from the coin integration space 13C side (the front side) through the sensor hole portion 38 other than the shutter housing part gap SP, in other words, up to the outside of the coin integration space 13C.

5. Configuration of Customer Service Unit

Figure 4:
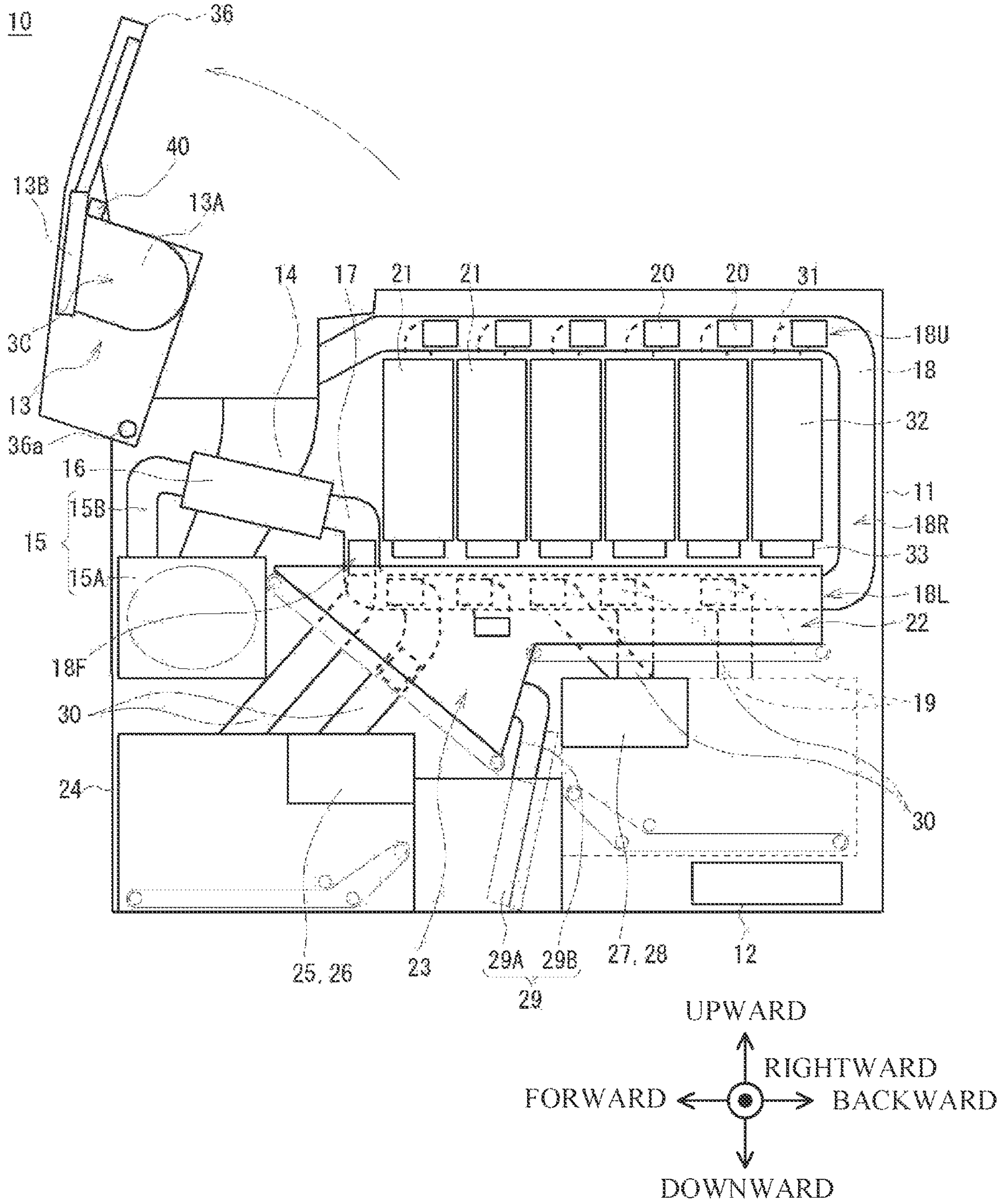
FIG. 4 is a right-side view illustrating a configuration of a coin processing device in a customer service unit open state.

As illustrated in FIGS. 2 and 4, a customer service unit 36 that can be opened or closed is disposed at an upper end of the front end of the coin processing device casing 11. The customer service unit 36 is disposed to be rotatable clockwise or counterclockwise in FIGS. 2, 4, 5A, and 5B with respect to the coin processing device casing 11 around a customer service unit rotation shaft 36*a* disposed at a front end lower end thereof. In this customer service unit 36, mainly, the depositing/dispensing unit 13 and a foreign material storage unit 40 are built.

For this reason, in the case of a normal operation, in accordance with the customer service unit 36 becoming a customer service unit closed state as illustrated in FIGS. 2 and 5A, the coin processing device 10 protects the inside of the coin processing device casing 11 from the outside. On the other hand, in a case in which a maintenance operation for eliminating a foreign material FS stored in the foreign material storage unit 40 or the like is performed, the customer service unit 36 rotates in an opening direction that is counterclockwise rotation in FIG. 4 and transitions to a customer service unit open state illustrated in FIGS. 4 and 5B, and accordingly, the coin processing device 10 exposes the foreign material storage unit 40 to the outside of the coin processing device casing 11.

6. Configuration of Foreign Material Storage Unit

As illustrated in FIGS. 5A to 13C, on a rear side of the container 13A of the depositing/dispensing unit 13, a foreign material storage unit 40 storing foreign materials FS that have entered into the shutter housing part gap SP or the sensor hole portion 38 and have moved from the coin integration space 13C side to a rear side of the rear-side plate 13*d* is disposed. The foreign material storage unit 40 is composed of a storage unit 42 and a support unit 44.

6-1. Configuration of Storage Unit

For example, the storage unit 42 is composed of a thin-plate shaped resin film that is transparent and bendable such as Mylar (registered trademark), has an approximate box shape of which an upper face is open as a whole, and has a storage unit bottom plate 42D, a storage unit rear-side plate 42B, a storage unit inner-side left plate 42LR, a storage unit outer-side left plate 42LL, and a storage unit front-side plate 42F. In addition, in the storage unit 42, in a space surrounded by the storage unit bottom plate 42D, the storage unit rear-side plate 42B, the storage unit inner-side left plate 42LR, the storage unit outer-side left plate 42LL, the storage unit front-side plate 42F, and a support unit right-side plate 44R of the support unit 44, a foreign material storage space 42S housing foreign materials FS is formed. Hereinafter, the storage unit rear-side plate 42B, the storage unit inner-side left plate 42LR, the storage unit outer-side left plate 42LL, and the storage unit front-side plate 42F that stands in a vertical direction from the storage unit bottom plate 42D will be collectively referred to as a wall part.

The storage unit bottom plate 42D is composed of a storage unit bottom plate right-side part 42DR and a storage unit bottom plate left-side part 42DL and forms a bottom face of the storage unit 42. The storage unit bottom plate right-side part 42DR has a rectangular shape that extends in a horizontal direction and is long in a leftward/rightward direction in the plan view, has a length in the leftward/rightward direction that is about ⅔ of a length of the storage unit 42 in the leftward/rightward direction, and is disposed on the right side of the storage unit 42. The storage unit bottom plate left-side part 42DL has a rectangular shape that extends in a horizontal direction and is long in a leftward/rightward direction in the plan view, has a length in the leftward/rightward direction that is about ⅓ of a length of the storage unit 42 in the leftward/rightward direction, and is disposed on the left side on an upper side of the storage unit bottom plate right-side part 42DR, in other words, on the left side of the storage unit 42.

The storage unit rear-side plate 42B is composed of a storage unit rear-side plate right part 42BR and a storage unit rear-side plate opening/closing part 42BL and forms a rear side face of the storage unit 42. The storage unit rear-side plate right part 42BR is along the vertical direction and is bent from a rear end of the storage unit bottom plate right-side part 42DR in an upward direction at right angles to the storage unit bottom plate right-side part 42DR. This storage unit rear-side plate right part 42BR has a length in a leftward/rightward direction that is about 2/3 of a length of the storage unit bottom plate right-side part 42DR in the leftward/rightward direction and is disposed on a right side of the storage unit bottom plate right-side part 42DR.

The storage unit rear-side plate opening/closing part 42BL as an opening/closing unit is along a vertical direction and is bent from a rear end of a storage unit outer-side left plate 42LL to be described below in a rightward direction at right angles to the storage unit outer-side left plate 42LL. This storage unit rear-side plate opening/closing part 42BL has a shape acquired by rotating a shape of letter "L" viewed from the rear face clockwise by 90 degrees and is rotatable clockwise or counterclockwise on the plan view around a storage unit rear-side plate opening/closing shaft 42BLa as an axis along the vertical direction that is a connection portion with the storage unit outer-side left plate 42LL.

At a lower end of a right end of the storage unit rear-side plate opening/closing part 42BL, a storage unit rear-side plate opening/closing part inserting part 42BLI is formed. The storage unit rear-side plate opening/closing part inserting part 42BLI as a fixing part has a shape acquired by rotating a letter "T" viewed from the rear face by 180 degrees and protrudes to the lower side. In the case of at the time of a normal operation of the coin processing device 10, the storage unit rear-side plate opening/closing part inserting part 42BLI comes into the storage unit closed state in accordance with the storage unit rear-side plate opening/closing part inserting part 42BLI being locked into an insertion part storage holding part 44DI of the support unit 44, whereby foreign materials FS are stored in the storage unit 42. On the other hand, in a case in which a maintenance operation for eliminating foreign materials FS stored in the storage unit 42 or the like is performed, in accordance with the storage unit rear-side plate opening/closing part inserting part 42BLI being gripped by a maintenance staff and is drawn to the rear side, the storage unit rear-side plate opening/closing part inserting part 42BLI is excluded from the insertion part storage holding part 44DI of the support unit 44, the storage unit rear-side plate opening/closing part 42BL rotates counterclockwise in the plan view around the storage unit rear-side plate opening/closing shaft 42BLa to cause the storage unit to be in an open state, and accordingly, a portion of the storage unit rear-side plate opening/closing part 42BL in the foreign material storage space 42S is exposed to the outside. In this way, the storage unit rear-side plate opening/closing part 42BL opens or closes the foreign material storage space 42S.

The storage unit inner-side left plate 42LR is disposed along the vertical direction, is bent from the left end of the storage unit bottom plate right-side part 42DR in an upward direction at right angles to the storage unit bottom plate right-side part 42DR, and has an upper end connected to a right end of the storage unit bottom plate left-side part 42DL. The storage unit outer-side left plate 42LL is disposed along the vertical direction, is bent in an upward direction from the left end of the storage unit bottom plate left-side part 42DL at right angles to the storage unit outer-side left plate 42LL, and forms a left side face of the storage unit 42.

The storage unit front-side plate 42F is composed of a storage unit front-side plate lower side part 42FD and a storage unit front-side plate inclination part 42FI and forms a front side face of the storage unit 42. The storage unit front-side plate lower side part 42FD is disposed along the vertical direction and is bent from a rear end of the storage unit bottom plate right-side part 42DR in an upward direction at right angles to the storage unit bottom plate right-side part 42DR. This storage unit front-side plate lower side part 42FD is formed from a left end to a right end of the storage unit bottom plate right-side part 42DR.

Figure 13A:
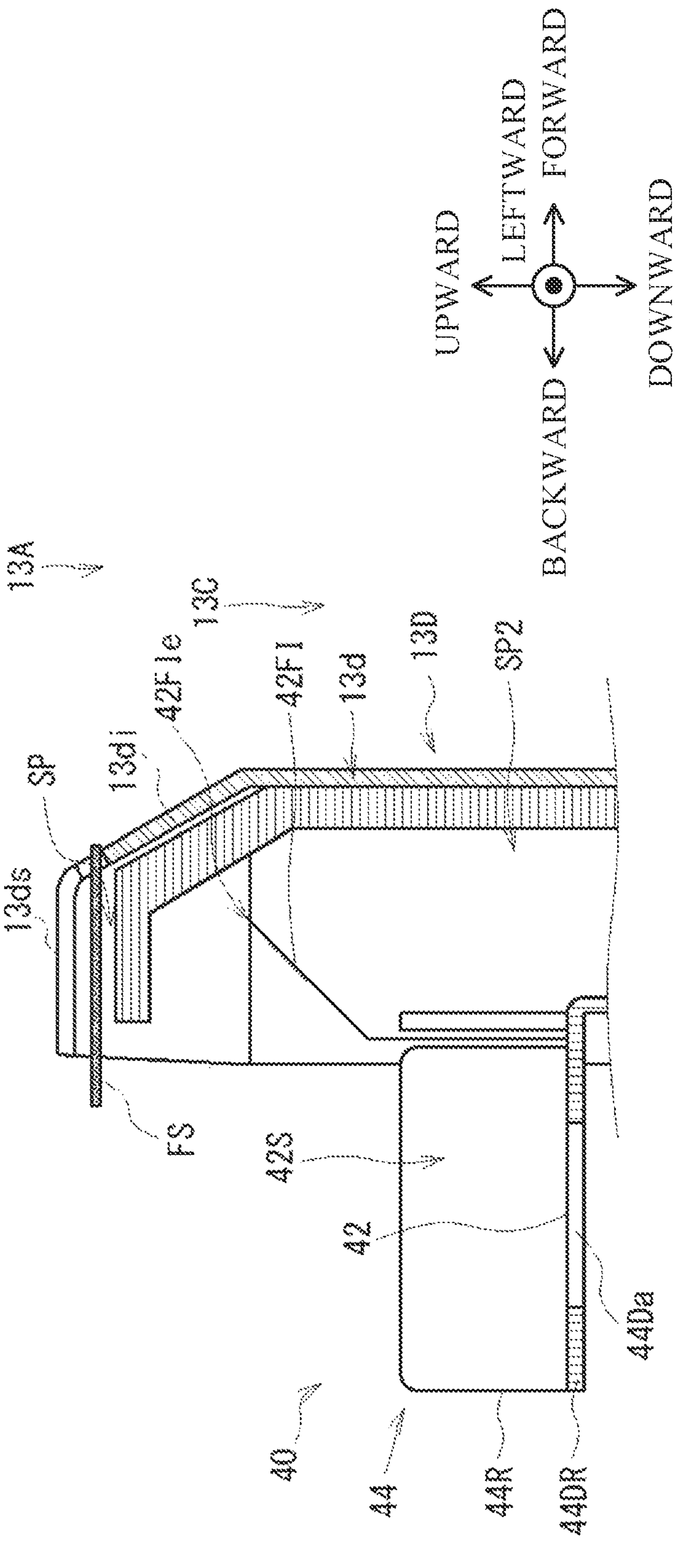
FIG. 13A illustrates a view in which foreign materials are stored in a foreign material storage unit and is a cross-sectional view taken along line X-X in FIG. 10.
Figure 13B:
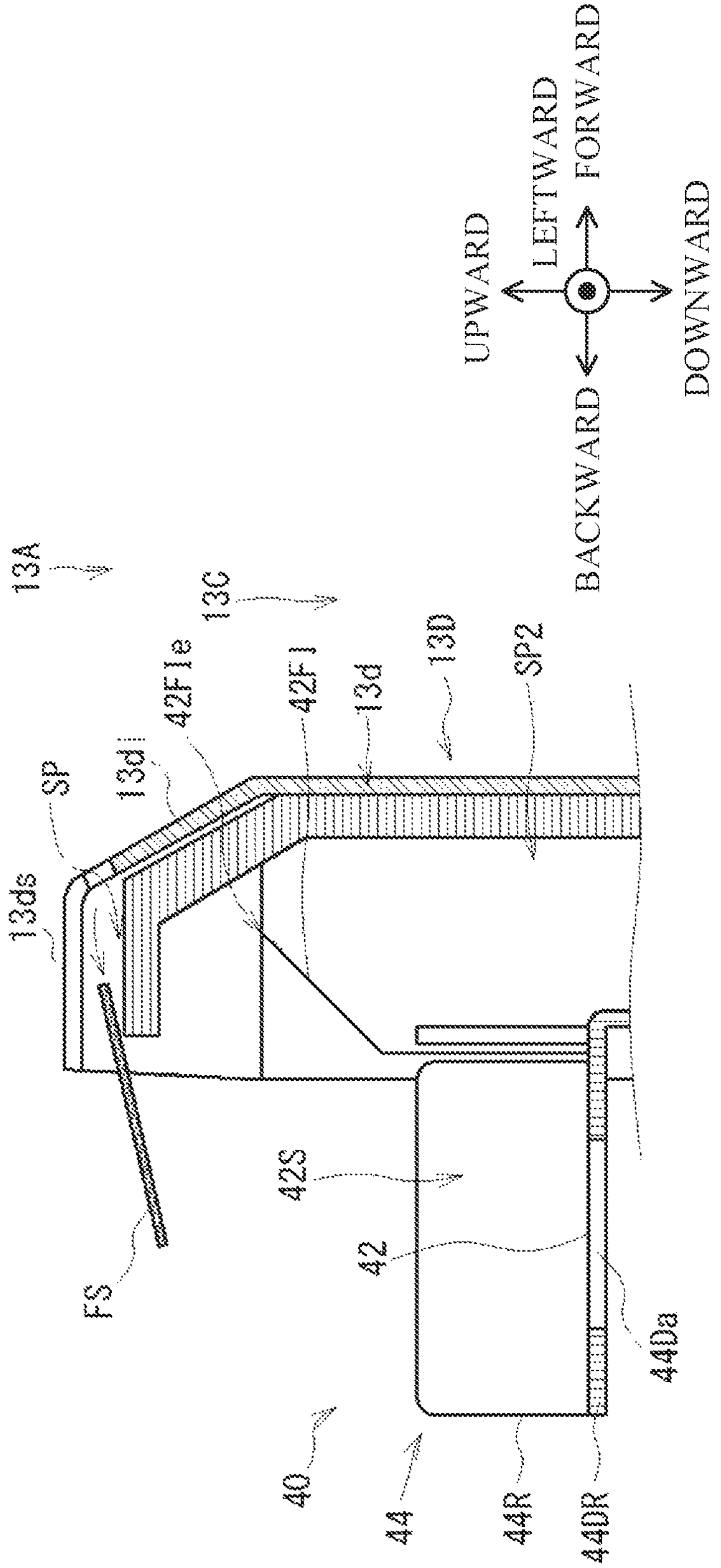
FIG. 13B illustrates a view in which a foreign material is stored in a foreign material storage unit and is a cross-sectional view along line X-X in FIG. 10.
Figure 13C:
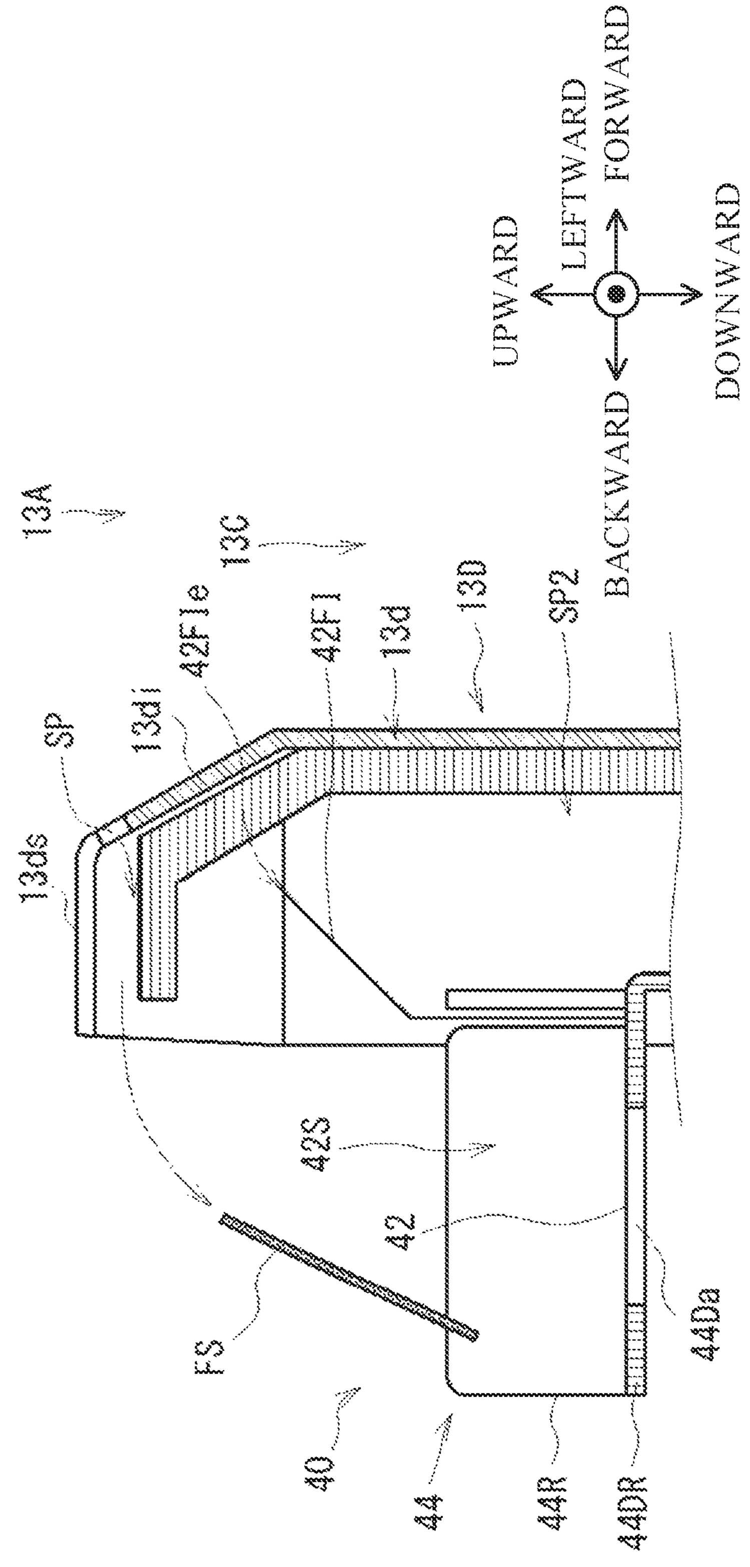
FIG. 13C illustrates a view in which a foreign material is stored in a foreign material storage unit and is a cross-sectional view along line X-X in FIG. 10.

The storage unit front-side plate inclination part 42FI is bent to be forwardly inclined upward such that it is inclined from an upper end of the storage unit front-side plate lower side part 42FD and a rear end of the storage unit bottom plate left-side part 42DL toward a front side that is the shutter opposing part 13*ds* side with respect to the vertical direction. A front end of the storage unit front-side plate inclination part 42FI becomes a storage unit front-side plate inclination part front end 42FIe. As illustrated in FIGS. 13A to 13C, the storage unit front-side plate inclination part front end 42FIe enters into from a lower side of the rear end of the shutter opposing part 13*ds* to a front side that is the coin integration space 13C side in relation to the forward/backward direction. For this reason, the storage unit front-side plate inclination part 42FI overlaps the rear end of the shutter opposing part 13*ds* in relation to the forward/backward direction. In accordance with this, the storage unit 42 can prevent foreign materials FS that have passed through the shutter housing part gap SP from falling in the storage unit container gap SP2 that is a gap between the storage unit 42 and the container 13A on the front side of the storage unit 42.

6-2. Configuration of Support Unit

The support unit 44 is configured by performing metal plate processing such as punching, bending, and the like on a plate made of metal having a predetermined thickness and has a support unit bottom plate 44D, support unit right-side plate 44R, a support unit left-side plate 44L, and a support unit front-side plate 44F. This support unit 44 has a part fixed to the container 13A and is positioned on a lower side of the storage unit 42 as a whole, thereby supporting the storage unit 42 from the lower side to maintain the strength of the storage unit 42.

The support unit bottom plate 44D is composed of a support unit bottom plate right-side part 44DR and a support unit bottom plate left-side part 44DL. The support unit bottom plate right-side part 44DR has almost the same external shape as the storage unit bottom plate right-side part 42DR of the storage unit 42 and is brought into contact with a lower face side of the storage unit bottom plate right-side part 42DR. The support unit bottom plate left-side part 44DL has almost the same external shape as the storage unit bottom plate left-side part 42DL of the storage unit 42 and is brought into contact with a lower face side of the storage unit bottom plate left-side part 42DL.

In the support unit bottom plate right-side part 44DR, a support unit bottom face opening portion 44Da having a rectangular shape long in the leftward/rightward direction in the plan view is punched over the upper face to the lower face of the support unit bottom plate right-side part 44DR. The support unit bottom face opening portion 44Da as an opening portion is positioned on a slight right side of the support unit bottom plate right-side part 44DR, has a length in the leftward/rightward direction that is about a half of the length of the support unit bottom plate right-side part 44DR in the leftward/rightward direction, and has a length in the forward/backward direction that is about a half of the length of the support unit bottom plate right-side part 44DR in the forward/backward direction. In this way, by punching the support unit bottom face opening portion 44Da having an area that is about ¼ of the support unit bottom plate right-side part 44DR in the support unit bottom plate right-side part 44DR, the support unit 44 exposes a part of the storage unit bottom plate right-side part 42DR in which foreign materials FS are stored to the lower face side of the support unit bottom plate right-side part 44DR through the support unit bottom face opening portion 44Da while maintaining the strength of the support unit bottom plate right-side part 44DR. In accordance with this, the foreign material storage unit 40 causes foreign materials FS stored in the transparent storage unit bottom plate right-side part 42DR to be visually recognizable from the lower face side of the support unit bottom plate right-side part 44DR through the support unit bottom face opening portion 44Da.

In addition, in a place of the support unit bottom plate right-side part 44DR that faces the storage unit rear-side plate opening/closing part inserting part 42BLI of the storage unit 42, the insertion part storage holding part 44DI as a storage holding part is formed. In the case of a normal operation of the coin processing device 10, the support unit 44 locks the storage unit rear-side plate opening/closing part inserting part 42BLI of the storage unit 42 using the insertion part storage holding part 44DI, thereby forming a storage unit closed state. On the other hand, in a case in which a maintenance operation is performed, the support unit 44 excludes the storage unit rear-side plate opening/closing part inserting part 42BLI of the storage unit 42 from the insertion part storage holding part 44DI, and a storage unit open state is formed.

The support unit right-side plate 44R is disposed along the vertical direction and is bent from the right end of the support unit bottom plate right-side part 44DR in an upward direction at right angles to the support unit bottom plate right-side part 44DR. The support unit left-side plate 44L is disposed along the vertical direction and is bent from the left end of the support unit bottom plate right-side part 44DR in an upward direction at right angles to the support unit bottom plate right-side part 44DR. This support unit left-side plate 44L has almost the same external shape as the storage unit inner-side left plate 42LR of the storage unit 42 and is brought into contact with the left face side of the storage unit inner-side left plate 42LR.

The support unit front-side plate 44F is disposed along the vertical direction and is bent from the right side of the front end of the support unit bottom plate right-side part 44DR in the upward direction at right angles to the support unit bottom plate right-side part 44DR. This support unit front-side plate 44F has a length in the upward/downward direction that is slightly shorter than the storage unit front-side plate lower side part 42FD of the storage unit 42 and has a length in the leftward/rightward direction that is about a half of the length of the support unit bottom plate right-side part 44DR in the leftward/rightward direction. In addition, the support unit front-side plate 44F is brought into contact with the front face side of the storage unit front-side plate lower side part 42FD of the storage unit 42.

A lower face of a double-sided tape 46 having a rectangular shape is attached to both ends including left and right ends of the storage unit bottom plate right-side part 44DR and a left end of the support unit bottom plate left-side part 44DL. The storage unit bottom plate right-side part 42DR and the storage unit bottom plate left-side part 42DL of the storage unit 42 are attached to an upper face of this double-sided tape 46. For this reason, the storage unit 42 is attached and fixed to the upper side of the support unit 44 using the double-sided tape 46.

7. Storage of Foreign Material

As illustrated in FIGS. 13A to 13C, when a foreign material FS enters from the coin integration space 13C side (the front side) of the rear-side plate 13*d*, for example, to the shutter housing part gap SP in the container 13A (FIG. 13A), the foreign material FS moves to the rear side inside the shutter housing part gap SP (FIG. 13B) and moves to the rear side of the rear end of the shutter housing part gap SP and falls, thereby being stored in the foreign material storage space 42S of the storage unit 42 of the foreign material storage unit 40 (FIG. 13C).

8. Foreign Material Elimination Method

When foreign materials FS stored in the foreign material storage unit 40 are to be eliminated, a maintenance staff, first, rotates the customer service unit 36 from the customer service unit closed state illustrated in FIG. 5A to the customer service unit open state illustrated in FIG. 5B to be in a state being able to access the foreign material storage unit 40. In this customer service unit open state, the maintenance staff checks whether or not any foreign material FS is stored inside of the foreign material storage unit 40 by viewing the foreign material storage space 42S of the storage unit 42 in a direction of an arrow AR1 through the support unit bottom face opening portion 44Da illustrated in FIG. 11.

Subsequently, by picking and moving the storage unit rear-side plate opening/closing part inserting part 42BLI of the storage unit rear-side plate opening/closing part 42BL of the storage unit 42 to the rear side with fingers, the maintenance staff excludes the storage unit rear-side plate opening/closing part inserting part 42BLI from the insertion part storage holding part 44DI. Furthermore, by further picking and moving the storage unit rear-side plate opening/closing part inserting part 42BLI to the rear side with fingers, the maintenance staff rotates the storage unit rear-side plate opening/closing part 42BL around the storage unit rear-side plate opening/closing shaft 42BLa as an opening/closing shaft to be in the storage unit open state illustrated in FIG. 12, thereby exposing the part of the storage unit rear-side plate opening/closing part 42BL in the foreign material storage space 42S to the outside and forming a state in which a maintenance staff's finger or tweezers is in contact with the foreign material storage space 42S. In this state, the maintenance staff picks and eliminates the foreign material FS of the foreign material storage space 42S using his or her finger or tweezers, thereby recovering the foreign material FS.

9. Effect and the Like

In the coin processing device 10 of the configuration described above, the foreign material storage unit 40 is disposed to be more adjacent to the rear side that is a side on which shutter 13B is positioned in the shutter-open state in the container 13A than the container 13A. For this reason, the coin processing device 10 can store foreign materials FS that have entered the shutter housing part gap SP or the sensor hole portion 38 from the coin integration space 13C using the foreign material storage unit 40. In accordance with this, by preventing foreign materials FS from entering each part of the inside of the coin processing device 10, the coin processing device 10 prevents occurrence of a factor for miscalculation and a load on the drive unit, thereby being able to improve reliability.

In addition, in the coin processing device 10, the storage unit rear-side plate opening/closing part inserting part 42BLI of the storage unit rear-side plate opening/closing part 42BL that is a part of the wall part of the storage unit 42 is configured to be attachable/detachable to/from the insertion part storage holding part 44DI. For this reason, without pressing a maintenance staff to perform a complicated operation of detaching the entire storage unit 42 from the support unit 44, only by causing the storage unit open state by excluding the storage unit rear-side plate opening/closing part inserting part 42BLI of the storage unit rear-side plate opening/closing part 42BL from the insertion part storage holding part 44DI, the coin processing device 10 allows a maintenance staff to eliminate foreign materials FS stored in the foreign material storage space 42S through a space into which the storage unit rear-side plate opening/closing part 42BL is saved. In accordance with this, the coin processing device 10 allows a maintenance staff to easily recover foreign materials FS and is able to improve the operability of elimination of foreign materials.

Furthermore, the coin processing device 10 configures the storage unit 42 of the foreign material storage unit 40 using a transparent member. For this reason, the foreign material storage unit 40 can form the foreign material storage space 42S of the storage unit 42 to be visible from the outside of the storage unit 42 and thus is able to cause foreign materials FS stored in the storage unit 42 to be visible from the outside of the storage unit 42.

Furthermore, in the coin processing device 10, the support unit bottom face opening portion 44Da is configured to be punched in the support unit bottom plate right-side part 44DR facing the storage unit bottom plate right-side part 42DR of the storage unit 42 in the support unit 44. For this reason, the foreign material storage unit 40 can form the foreign material storage space 42S of the storage unit 42 to be visible from the outside of the storage unit 42 in a direction of arrow AR1 through the support unit bottom face opening portion 44Da as illustrated in FIG. 11 in the customer service unit open state illustrated in FIG. 5B.

According to the configuration described above, the coin processing device 10 includes the depositing/dispensing unit 13 that has the container 13A as a feeding unit into which coins as media are put and the shutter 13B opening or closing the container 13A and the foreign material storage unit 40 that is disposed on a side opposite to the container 13A with the housing part inside/outside communication space 48 as a gap formed in the depositing/dispensing unit 13 therebetween and stores foreign materials FS that have entered from the housing part inside/outside communication space 48. In accordance with this, the coin processing device 10 can store foreign materials FS that have entered from the coin integration space 13C to the housing part inside/outside communication space 48 using the foreign material storage unit 40 and can prevent the foreign materials FS from entering each unit of the inside of the coin processing device 10.

10. Other Embodiments

10-1. Another Embodiment 1

10-1-1. Configuration of Foreign Material Storage Unit

Figure 14A:
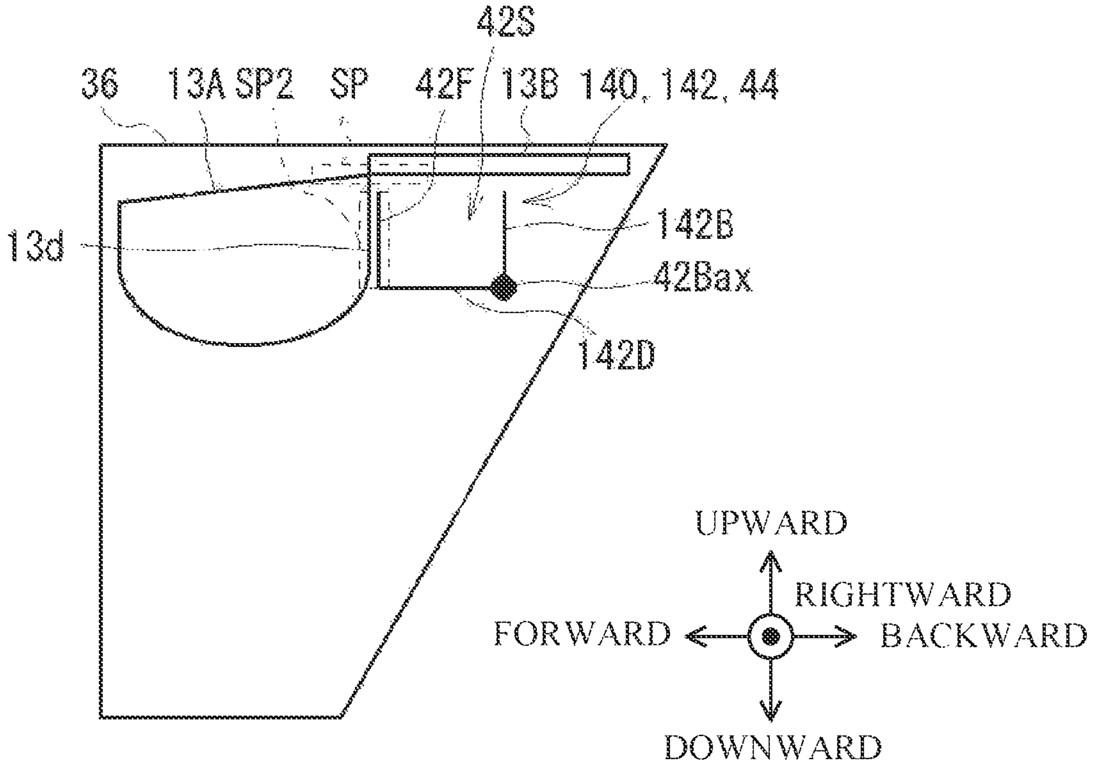
FIG. 14A is a right-side view illustrating a view in which a customer service unit according to another embodiment rotates and is in a customer service unit closed state.
Figure 14B:
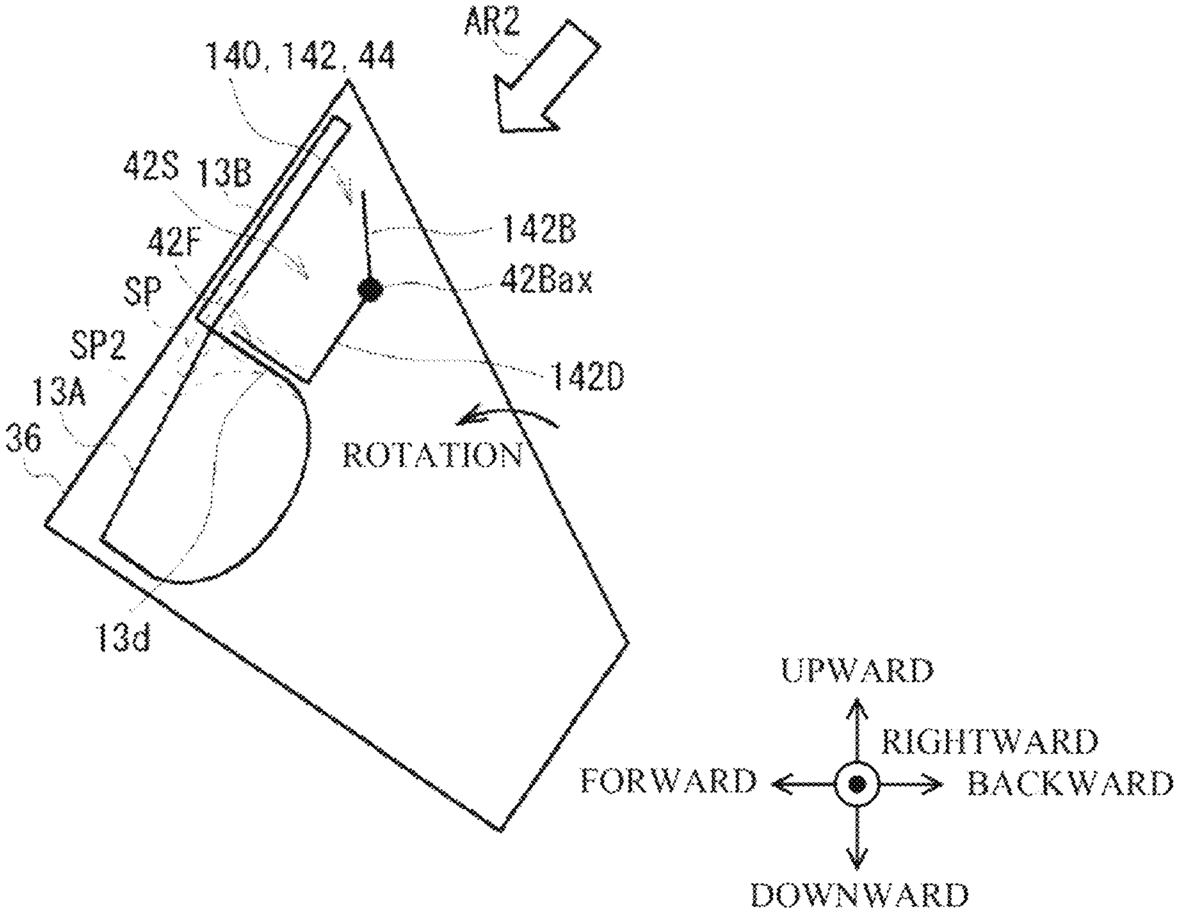
FIG. 14B is a right-side view illustrating a view in which a customer service unit according to another embodiment rotates and is in a customer service unit open state.

As illustrated in FIGS. 14A and 14B in which the same reference signs are assigned to members corresponding to FIGS. 5A and 5B, a foreign material storage unit 140 according to another embodiment is different from the foreign material storage unit 40 in that a storage unit 142 is included in place of the storage unit 42, and other points are similarly configured.

Although the storage unit 142 is different from the storage unit 42 in that it includes a storage unit rear-side plate 142B in place of the storage unit rear-side plate 42B and a storage unit bottom plate 142D in place of the storage unit bottom plate 42D, other points are similarly configured. The storage unit rear-side plate 142B, in which the storage unit rear-side plate opening/closing part 42BL is not disposed, can rotate clockwise and counterclockwise when viewed from the right side face with respect to the storage unit bottom plate 142D around a storage unit rear-side plate bottom plate connection part 42Bax that is a connection part between the storage unit rear-side plate 142B and the storage unit bottom plate 142D as an axis with respect to the storage unit rear-side plate 142B.

In the storage unit 142, the storage unit rear-side plate bottom plate connection part 42Bax is connected to a coin processing device casing 11 that is a place other than a customer service unit 36 that does not move together with the customer service unit 36 at the time of transition between a customer service unit closed state and a customer service unit open state using a link mechanism (not illustrated). This storage unit 142 has a shape similar to the storage unit 42 (FIG. 5A) in the customer service unit closed state (FIG. 14A). On the other hand, in the storage unit 142, at the time of transition from the customer service unit closed state (FIG. 14A) to the customer service unit open state (FIG. 14B), in accordance with the storage unit rear-side plate 142B being pulled to the rear side by the link mechanism, an upper end of the storage unit rear-side plate 142B in the vertical direction is inclined to the rear side. In this state, the storage unit rear-side plate 142B is saved to the rear side and thus largely exposes a rear side face of a foreign material storage space 42S to the outside.

In the storage unit 42 described above, the entire storage unit 42 is not transformed in accordance with rotation of the customer service unit 36 and rotates with the customer service unit 36. In contrast to this, in the storage unit 142, in accordance with rotation of the customer service unit 36, although a storage unit front-side plate 42F and a storage unit bottom plate 142D rotate together with the customer service unit 36, the storage unit rear-side plate 142B does not rotate together with the customer service unit 36 and largely exposes and opens the foreign material storage space 42S to the outside.

For this reason, compared to the foreign material storage unit 40, only by rotating the customer service unit 36, the storage unit rear-side plate 142B rotates with respect to the storage unit bottom plate 142D and exposes the rear side face of the foreign material storage space 42S, and accordingly, the foreign material storage unit 140 enables foreign materials FS stored in the storage unit 142 to be visible from the outside of the storage unit 142 and can recover the foreign materials FS without causing a maintenance staff to perform operations of opening and closing the storage unit rear-side plate opening/closing part 42BL.

10-1-2. Foreign Material Elimination Method

When foreign materials FS stored in the foreign material storage unit 140 are to be eliminated, first, by rotating the customer service unit 36 from a customer service unit closed state illustrated in FIG. 14A to a customer service unit open state illustrated in FIG. 14B, a maintenance staff forms a state in which the foreign material storage unit 140 is accessible. At this time, in accordance with the storage unit rear-side plate 142B being pulled to the rear side by a link mechanism, the storage unit 142 exposes a rear side face of the foreign material storage space 42S to be large. In this customer service unit open state, the maintenance staff checks whether or not a foreign material FS is stored in the inside of the foreign material storage unit 140 by viewing the foreign material storage space 42S of the storage unit 142 in a direction of arrow AR2. Subsequently, the maintenance staff picks and eliminates the foreign material FS of the foreign material storage space 42S from the storage unit rear-side plate 142B using his or her finger or tweezers, thereby recovering the foreign material FS.

10-1-3. Effects and the Like

In the configuration described above, by linking opening/closing of the storage unit rear-side plate 142B with an opening/closing operation of the customer service unit 36, the storage unit 142 is configured to rotate with respect to the storage unit bottom plate 142D such that, when the customer service unit 36 rotates from the customer service unit closed state to the customer service unit open state, the storage unit rear-side plate 142B is separated away from the foreign material storage space 42S by being pulled in accordance with rotation of the customer service unit 36.

For this reason, only by causing a maintenance staff to perform an operation of rotating the customer service unit 36 from the customer service unit closed state to the customer service unit open state, which is an operation essentially necessary at the time of accessing the foreign material storage unit 140, the storage unit 142 can enable foreign materials FS stored in the storage unit 142 to be visible from the outside of the storage unit 142 by exposing the rear side face of the foreign material storage space 42S and recover the foreign materials FS.

In accordance with this, compared with the coin processing device 10, the storage unit 142 can further improve the visibility of foreign materials FS disposed inside of the foreign material storage unit 140 from the outside and further improve a degree of easiness in recovery of the foreign materials FS.

Also for the other points, the foreign material storage unit 140 can have operations and effects similar to those of the foreign material storage unit 40.

10-2. Another Embodiment 2

In addition, in the embodiment described above, a case in which the storage unit 42 is configured using Mylar (registered trademark) has been described. The present invention is not limited thereto, and the storage unit 42 may be configured using other various materials.

10-3. Another Embodiment 3

Furthermore, in the embodiment described above, a case in which the entire storage unit 42 is configured using Mylar (registered trademark) that is a transparent resin film has been described. The present invention is not limited thereto, and at least a part of the storage unit 42 may not be transparent. In such a case, in order to allow the foreign material storage space 42S to be visible through the support unit bottom face opening portion 44Da, particularly, it is preferable that the storage unit bottom plate 42D be transparent.

10-4. Another Embodiment 4

In addition, in the embodiment described above, a case in which foreign materials FS are stored by the storage unit 42, and the storage unit 42 is supported by the support unit 44 has been described. The present invention is not limited thereto, and when the strength of the support unit 44 can be maintained by forming the support unit 44 using molding, for example, transparent plastic or the like, the support unit 44 may be omitted.

10-5. Another Embodiment 5

Furthermore, in the embodiment described above, a case in which one set of the storage unit rear-side plate opening/closing part inserting part 42BLI and the insertion part storage holding part 44DI are formed in each of the storage unit 42 and the support unit 44 has been described. The present invention is not limited thereto, and two sets of the storage unit rear-side plate opening/closing part inserting part 42BLI and the insertion part storage holding part 44DI may be formed in each of the storage unit 42 and the support unit 44, and a wall part between the storage unit rear-side plate opening/closing part inserting part 42BLI of one set and the storage unit rear-side plate opening/closing part inserting part 42BLI of the other set in the storage unit 42 may be configured to be attachable/detachable to/from the support unit 44.

10-6. Another Embodiment 6

In addition, in the embodiment described above, a case in which the storage unit rear-side plate opening/closing part 42BL is formed in a part of the storage unit rear-side plate 42B that is a part of the wall part of the storage unit 42 has been described. The present invention is not limited thereto, and an opening/closing unit that exposes the foreign material storage space 42S to the outside may be formed in the storage unit bottom plate 42D.

10-7. Another Embodiment 7

Furthermore, in the embodiment described above, a case in which the support unit bottom face opening portion 44Da is punched in the support unit bottom plate right-side part 44DR has been described. The present invention is not limited thereto, and an opening portion may be formed using various methods, for example, bending of a part of the support unit bottom plate right-side part 44DR or the like.

10-8. Another Embodiment 8

In addition, in the embodiment described above, a case in which the support unit bottom face opening portion 44Da is formed in a rectangular shape that is long in a leftward/rightward direction in the plan view has been described. The present invention is not limited thereto, and the support unit bottom face opening portion 44Da may be in various shapes such as a triangular shape, a square shape, a circular shape, an oval shape, and the like in the plan view.

10-9. Another Embodiment 9

Furthermore, in the embodiment described above, a case in which the customer service unit 36 transitions between the customer service unit closed state and the customer service unit open state through rotation has been described. The present invention is not limited thereto, the customer service unit 36 may transition between the customer service unit closed state and the customer service unit open state by moving in various types such as sliding movement.

10-10. Another Embodiment 10

In addition, in the embodiment described above, a case in which the present invention is applied to the foreign material storage unit 40 storing foreign materials FS that have entered the shutter housing part gap SP that is a gap between the container 13A and the shutter 13B and the sensor hole portion 38 formed in the container 13A has been described. The present invention is not limited thereto, and the present invention may be applied to other various places in which an essential gap is present, for example, a stacker that has a sensor hole portion and a conveyance path and integrates coins for each type of coins, and the like.

10-11. Another Embodiment 11

Furthermore, in the embodiment described above, a case in which the present invention is applied to the foreign material storage unit 40 built in the coin processing device 10 of the automatic teller machine 1 (FIG. 1) performing various transactions with a user has been described. The present invention is not limited thereto, and the present invention may be applied to various devices handling coins, for example, a cash management device that is installed inside a financial organization, a store of a supermarket, and the like and performs processes such as counting, classification, and the like of coins in accordance with an operation of a staff, a clerk, or the like of the store and the like.

10-12. Another Embodiment 12

In addition, the present invention is not limited to each embodiment and the other embodiments described above. In other words, an application range of the present invention is applied also to an embodiment in which each embodiment described above and a part or the whole of the another embodiment described above are arbitrarily combined and an embodiment in which a part thereof is extracted.

10-13. Another Embodiment 13

Furthermore, in the embodiment described above, a case in which the coin processing device 10 as a medium processing device is composed of the depositing/dispensing unit 13 as a depositing/dispensing unit and the foreign material storage unit 40 as a foreign material storage unit has been described. The present invention is not limited thereto, and the coin processing device may be composed of a depositing/dispensing unit and a foreign material storage unit formed to have other various configurations.

INDUSTRIAL APPLICABILITY

The present invention, for example, can be used in an automatic teller machine performing a transaction process relating to coins with a user and the like.

REFERENCE SIGNS LIST

1 Automatic teller machine
2 Casing
3 Reception unit
4 Bankbook entrance/exit port
5 Card entrance/exit port
6 Coin depositing/dispensing port
7 Bill depositing/dispensing port
8 Operation display unit
9 Main control unit
10 Coin processing device
11 Coin processing device casing
12 Coin control unit
13 Depositing/dispensing unit
13A Container
13B Shutter
13Bb Shutter plate shaped part
13Bp Shutter protrusion part
13C Coin integration space
13D Coin integration plate
13*d* Rear-side plate
13*di* Inclination part
13*ds* Shutter opposing part
14 Chute unit
15 Upper separation unit
15A Integration separation part
15B Separation conveyance part
16 Recognition conveyance unit
17 Delivery unit
18 Pin belt conveyance unit
19 Branching part
20 Stacker branching part
21 Stacker unit
22 Dispensing conveyance unit
23 Temporary storage unit
24 Supplementary recovery storage
25 First supplementary rejection storage
26 Second supplementary rejection storage
27 Rejection storage
28 Lost acquisition storage
29 Lower separation unit
29A Integration separation part
29B Separation conveyance part
30, 31 Guide part
32 Integration part
33 Feed-out part
34 Shutter opposing part groove
36 Customer service unit
36*a* Customer service unit rotation shaft
38 Sensor hole portion
40, 140 Foreign material storage unit
42, 142 Storage unit
42S Foreign material storage space
42D, 142D Storage unit bottom plate
42DR Storage unit bottom plate right-side part
42DL Storage unit bottom plate left-side part
42B, 142B Storage unit rear-side plate
42BR Storage unit rear-side plate right part
42BL Storage unit rear-side plate opening/closing part
42BLI Storage unit rear-side plate opening/closing part inserting part
42BLa Storage unit rear-side plate opening/closing shaft 42Bla
42LR Storage unit inner-side left plate
42LL Storage unit outer-side left plate
42F Storage unit front-side plate
42FD Storage unit front-side plate lower side part
42FI Storage unit front-side plate inclination part
42FIe Storage unit front-side plate inclination part front end

42Bax Storage unit rear-side plate bottom plate connection part
44 Support unit
44D Support unit bottom plate
44DR Support unit bottom plate right-side part
44Da Support unit bottom face opening portion
44DI Insertion part storage holding part
44DL Support unit bottom plate left-side part
44R Support unit right-side plate
44L Support unit left-side plate
44F Support unit front-side plate
46 Double-sided tape
48 Housing part inside/outside communication space
SP Shutter housing part gap
SP2 Storage unit container gap
FS Foreign materials
AR1, AR2 Arrows

The invention claimed is:

1. A medium processing device, comprising:

a depositing/dispensing unit that has a feeding unit into which media are fed and a shutter opening/closing the feeding unit; and a foreign material storage unit that is disposed on a side opposite to the feeding unit with a gap formed in the depositing/dispensing unit interposed therebetween and stores foreign materials that have entered from the gap, wherein the foreign material storage unit has a bottom plate part and a wall part forming a space storing the foreign materials, an opening/closing unit that opens or closes the space is formed in at least a part of the bottom plate part or the wall part, and the opening/closing unit is disposed to be able to open or close with an opening/closing shaft as its center.

2. The medium processing device according to claim 1, wherein the opening/closing unit has the opening/closing shaft disposed on one end side and has a fixing unit on the other end side, and wherein the fixing unit is fixed to be able to be attached/detached to/from a storage holding part disposed in the bottom plate part.

3. The medium processing device according to claim 1, wherein the foreign material storage unit is composed of a storage unit that forms a space storing the foreign materials and a support unit that supports the storage unit from a lower side.

4. The medium processing device according to claim 3, wherein at least a part of the storage unit is composed of a transparent member.

5. The medium processing device according to claim 3, wherein, in the support unit, an opening portion is formed from an upper face at which the storage unit is positioned to a lower face.

6. The medium processing device according to claim 1, wherein at least a part of the foreign material storage unit is composed of a transparent member.

7. The medium processing device according to claim 1, wherein the gap is a space between the shutter and the feeding unit.

8. The medium processing device according to claim 7, wherein the feeding unit has a shutter opposing part that faces the shutter, wherein the shutter has a protrusion part, wherein the shutter opposing part has a groove at a place facing the protrusion part, wherein the shutter and the shutter opposing part are engaged with each other in accordance with the protrusion part entering the groove, and wherein the gap is a space between the protrusion part and the groove.

9. The medium processing device according to claim 1, wherein the foreign material storage unit has a bottom plate part and a wall part forming a space storing the foreign materials, and wherein an end of the wall part on a feeding unit side is positioned on the feeding unit side of an end on a foreign material storage unit side in the gap.

* * * * *